US010908425B2

(12) United States Patent
Nishizawa et al.

(10) Patent No.: US 10,908,425 B2
(45) Date of Patent: Feb. 2, 2021

(54) TRANSMISSION-TYPE HEAD MOUNTED DISPLAY APPARATUS, DISPLAY CONTROL METHOD, AND COMPUTER PROGRAM

(71) Applicant: SEIKO EPSON CORPORATION, Tokyo (JP)

(72) Inventors: Kazuo Nishizawa, Matsumoto (JP); Masahide Takano, Matusmoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 43 days.

(21) Appl. No.: 16/225,265

(22) Filed: Dec. 19, 2018

(65) Prior Publication Data

US 2019/0187479 A1    Jun. 20, 2019

(30) Foreign Application Priority Data

Dec. 20, 2017    (JP) .................................. 2017-244059

(51) Int. Cl.
  *G02B 27/01* (2006.01)
  *G06F 3/0488* (2013.01)
  *G06F 3/0354* (2013.01)
  *G06T 19/00* (2011.01)

(52) U.S. Cl.
  CPC ..... *G02B 27/0172* (2013.01); *G06F 3/03547* (2013.01); *G06F 3/04883* (2013.01); *G06T 19/006* (2013.01); *G02B 2027/014* (2013.01); *G02B 2027/0138* (2013.01); *G02B 2027/0141* (2013.01); *G02B 2027/0178* (2013.01)

(58) Field of Classification Search
  None
  See application file for complete search history.

(56) References Cited

U.S. PATENT DOCUMENTS

| | | | |
|---|---|---|---|
| 2006/0156222 A1 | 7/2006 | Chi et al. | |
| 2008/0071559 A1* | 3/2008 | Arrasvuori | G06Q 30/06 705/26.1 |
| 2012/0249797 A1* | 10/2012 | Haddick | G06F 3/016 348/158 |
| 2016/0117864 A1* | 4/2016 | Cajigas | G09G 5/00 345/633 |
| 2018/0203596 A1* | 7/2018 | Dhaliwal | G06F 3/04883 |

FOREIGN PATENT DOCUMENTS

| | | |
|---|---|---|
| JP | 2006-190298 A | 7/2006 |
| JP | 2012-181809 A | 9/2012 |

* cited by examiner

*Primary Examiner* — Christopher J Kohlman
(74) *Attorney, Agent, or Firm* — Oliff PLC

(57) ABSTRACT

A transmission-type head mounted display apparatus including an image display unit configured to transmit an external scene and display an image of a display object to be viewed along with the external scene, a gesture detection unit configured to detect a predefined gesture for the displayed image of the display object, and a display controller configured to perform at least one of display of the image of the display object in a display mode corresponding to the gesture having been detected and display of related information that corresponds to the gesture having been detected and that is associated with the display object.

10 Claims, 18 Drawing Sheets

GL

| No. | TYPE OF GESTURE | CONTENT OF RELATED INFORMATION |
|---|---|---|
| 1 | GRASPING | – |
| 2 | STROKING | TEXTURE, MATERIAL |
| 3 | TOUCHING | – |
| 4 | PULLING | INSIDE, MECHANISM |
| 5 | CUTTING | INSIDE, MECHANISM |
| 6 | NIPPING | LENGTH |
| 7 | LIFTING | WEIGHT |
| 8 | PINCHING | – |
| 9 | USE | INFORMATION OF USAGE |

Fig. 11

TRANSMISSION-TYPE HEAD MOUNTED DISPLAY APPARATUS, DISPLAY CONTROL METHOD, AND COMPUTER PROGRAM

BACKGROUND

1. Technical Field

The invention relates to a transmission-type head mounted display apparatus.

2. Related Art

As a head mounted display apparatus (Head Mounted Display (HMD)) mounted on a user's head to display images and the like within the user's visual field, a transmission-type head mounted display apparatus is known that allows an external scene to be transmissively viewed along with the images. The head mounted display apparatus, for example, utilizes a projective optical system, a light-guiding plate, and the like to guide, to the user's eyes, image light generated by utilizing a liquid crystal display and a light source, and allows the user to recognize a virtual image. JP-A-2012-181809 discloses a technique that allows the user with the transmission-type head mounted display apparatus to control a device to be operated (e.g., a DVD player). In this technique, in a case where a gesture of touching the device with the user's finger is detected in an area where the user can transmissively view the external scene, buttons associated with the device operations such as turning on/off a power supply are displayed overlapped with such on the device. The user then makes a gesture of selecting from the buttons to cause the selected operation to be performed. JP-A-2006-190298 discloses a technique for highlighting a keyword indicated by the user, a sentence associated with the keyword, or the like in electronic text.

However, the techniques described in JP-A-2012-181809 and JP-A-2006-190298 assume that the user recognizes an operated object of the device to be operated and a keyword in advance. Therefore, in a case where, for example, the user attempts to browse (search) for a searched object without knowing or being confident of the keyword indicating the searched object, it is difficult to obtain desired information about the searched object through a relatively small number of searches. A technique has thus been desired that improves, in a case that a user is uncertain about the keyword indicating a searched object, operability of searching the searched object, and that allows the user to easily obtain information associated with the searched object.

SUMMARY

The invention has been made to address at least some of the above-described issues, and can be realized as the following embodiments.

(1) An embodiment of the invention provides a transmission-type head mounted display apparatus. The transmission-type head mounted display apparatus includes an image display unit configured to transmit an external scene and display an image of a display object to be viewed along with the external scene, a gesture detection unit configured to detect a predefined gesture for the displayed image of the display object, and a display controller configured to perform at least one of display of the image of the display object in a display mode corresponding to the gesture having been detected and display of related information that corresponds to the gesture having been detected and that is associated with the display object.

The transmission-type head mounted display apparatus according to the aspect includes the gesture detection unit configured to detect the predefined gesture for the displayed image of the display object, and the display controller configured to perform at least one of display of the image of the display object in the display mode corresponding to the gesture having been detected and display of the related information that corresponds to the gesture having been detected and that is associated with the display object. The image of the display object is thus displayed in the display mode corresponding to the detected gesture, allowing operability in displaying the image of the display object to be improved. Furthermore, the related information corresponding to the detected gesture and associated with the display object is displayed, allowing information related to the display object to be easily acquired. In other words, according to the transmission-type head mounted display apparatus according to the aspect, the operability in searching for the display object can be improved, and the information related to the display object can be easily acquired.

(2) In the transmission-type head mounted display apparatus according to the above-described aspect, in a case of causing the related information to be displayed, the display controller may be configured to change content of the related information for display according to a position of the gesture having been detected. According to the transmission-type head mounted display apparatus according to the aspect, the content of the related information is changed according to the position of the detected gesture and the related information with the changed content is displayed. A user can thus acquire the related information that varies depending on a position where the user makes a gesture and can easily acquire various types of related information.

(3) The transmission-type head mounted display apparatus according to the above-described aspect may further include an input receiving unit configured to receive an input of a keyword, and the display controller may be configured to cause the image of the display object identified by the keyword having been received to be displayed according to a type of the keyword having been received in a display mode for simulating a state where the display object identified by the keyword is actually used. According to the transmission-type head mounted display apparatus according to the aspect, the image of the display object identified by the keyword having been received is displayed according to the type of the keyword having been received in the display mode simulating the state where the display object identified by the keyword is actually used. The user can thus easily imagine the state where the display object is actually used, allowing the convenience of the user to be improved.

(4) The transmission-type head mounted display apparatus according to the above-described aspect may further include an input receiving unit configured to receive an input of a keyword, and the display controller may be configured to cause the image of the display object identified by the keyword having been received to be displayed according to a type of the keyword having been received in a presentation mode for simulating a state where the display object identified by the keyword is actually presented. According to the transmission-type head mounted display apparatus according to the aspect, the image of the display object identified by the keyword having been received is displayed according to the type of the keyword having been received in the presentation mode simulating the state where the display object identified by the keyword is actually presented. The user can thus intuitively recognize the display object, allowing the convenience of the user to be improved.

(5) In the transmission-type head mounted display apparatus according to the above-described aspect, the image display unit may be configured to further display an image for object presentation that is different from the image of the display object and that is an image of presentation equipment used in a case where the display object is actually presented, the gesture detection unit may be configured to further detect a gesture for the image for object presentation, and the display controller may be configured to cause the image of the display object to be additionally displayed according to the gesture, for the image for object presentation, that has been detected. According to the transmission-type head mounted display apparatus according to the aspect, the image for object presentation is displayed that is the image of presentation equipment used in a case where the display object is actually presented, and an image of the display object is additionally displayed according to the gesture for the detected image for object presentation. Thus, by performing a gesture for the image for object presentation, more images of display objects can be displayed, allowing operability in displaying the image of the display object to be improved. This enables the convenience of the user to be improved.

(6) In the transmission-type head mounted display apparatus according to the above-described aspect, the input receiving unit may receive at least one of a text input of the keyword and a voice input of the keyword. According to the transmission-type head mounted display apparatus according to the aspect, at least one of the text input of the keyword and the voice input of the keyword is received. The user can thus enter the keyword as a text or a voice, allowing the convenience of the user to be improved.

(7) In the transmission-type head mounted display apparatus according to the above-described aspect, the display controller may be configured to cause the image of the display object to be displayed as a three-dimensional parallax image. According to the transmission-type head mounted display apparatus according to the aspect, the image of the display object is displayed as a three-dimensional parallax image. This enables the image of the display object to be made noticeable and allows visibility of the image of the display object to be improved.

(8) In the transmission-type head mounted display apparatus according to the above-described aspect, the image of the display object may be a result of a predefined type of search. According to the transmission-type head mounted display apparatus according to the aspect, the image of the display object is the result of the predefined type of search. This allows operability in searching for the display object to be improved.

Various embodiments of the invention may be implemented. For example, the embodiments of the invention may include a display control method for a transmission-type head mounted display apparatus, a computer program for implementing the display control method, and a recording medium in which the computer program is recorded.

BRIEF DESCRIPTION OF THE DRAWINGS

The invention will be described with reference to the accompanying drawings, wherein like numbers reference like elements.

FIG. 11 is an explanatory diagram illustrating an example of an association relationship between the type of gesture and the content of related information.

DESCRIPTION OF EXEMPLARY EMBODIMENTS

A. First Exemplary Embodiment

A1. Overall Configuration of Transmission-Type Display Apparatus

Figure 1:
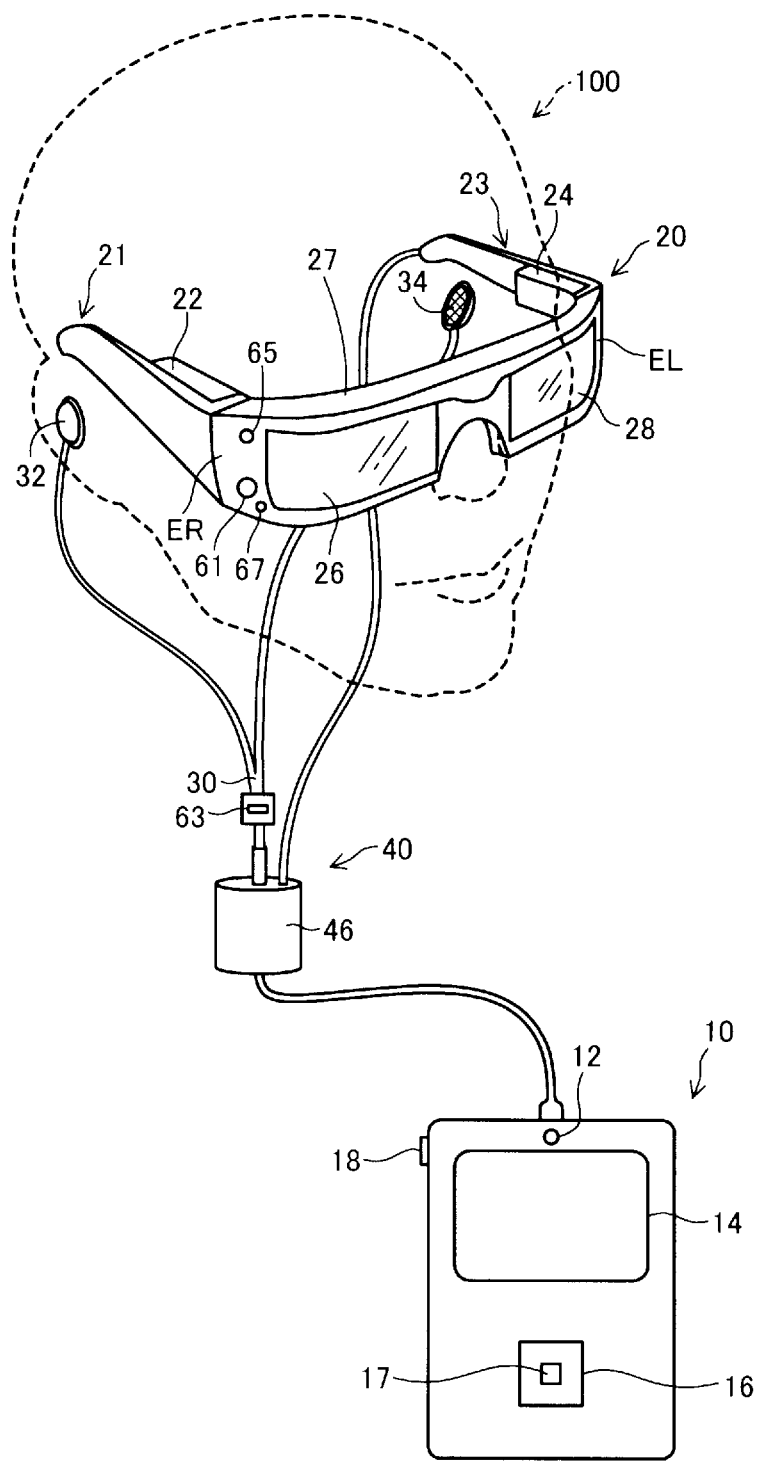
FIG. 1 is an explanatory diagram illustrating a schematic configuration of a head mounted display apparatus according to an exemplary embodiment of the invention.

FIG. 1 is an explanatory diagram illustrating a schematic configuration of a head mounted display apparatus 100 according to an exemplary embodiment of the invention. The head mounted display apparatus 100 is a display apparatus to be mounted on a user's head and is also referred to as a Head Mounted Display (HMD). The HMD 100 is a see-through (transmission-type) head mounted display apparatus that provides an image appearing in an external scene viewed through glasses.

The HMD 100 includes an image display unit 20 configured to allow the user to view images and a control device (controller) 10 configured to control the image display unit 20.

The image display unit 20 is a head-mounted body to be mounted on the user's head and is shaped like eyeglasses in the exemplary embodiment. The image display unit 20 includes a support body including a right holding portion 21, a left holding portion 23, and a front frame 27 and further includes, on the support body, a right display unit 22, a left display unit 24, a right light-guiding plate 26, and a left light-guiding plate 28.

The right holding portion 21 and the left holding portion 23 respectively extend rearward from ends of the front frame 27 to hold the image display unit 20 on the user's head in a manner similar to the temples of a pair of eyeglasses. Here, when a user wears the image display unit 20, an end ER refers to one of the ends of the front frame 27 that lies on the right side of the user, while an end EL refers to the other end that lies on the left side of the user. The right holding portion 21 is provided to extend from the end ER of the front frame 27 to a position corresponding to the right temple of the user when the user wears the image display unit 20. The left holding portion 23 is provided to extend from the end EL of the front frame 27 to a position corresponding to the left temple of the user when the user wears the image display unit 20.

The right light-guiding plate 26 and the left light-guiding plate 28 are provided in the front frame 27. The right light-guiding plate 26 is positioned in front of the right eye of the user, when the user wears the image display unit 20, to allow the right eye to view an image. The left light-guiding plate 28 is positioned in front of the left eye of the user, when the user wears the image display unit 20, to allow the left eye to view an image.

The front frame 27 is shaped to connect one end of the right light-guiding plate 26 and one end of the left light-guiding plate 28 to each other. The position of connection corresponds to a position between eyebrows of the user when the user wears the image display unit 20. The front frame 27 may include a nose pad portion that is provided at the position of connection between the right light-guiding plate 26 and the left light-guiding plate 28, and that is in contact with the nose of the user when the user wears the image display unit 20. In this case, the nose pad portion, the right holding portion 21, and the left holding portion 23 allow the image display unit 20 to be held on the head of the user. A belt may also be attached to the right holding portion 21 and the left holding portion 23 that fits to the back of the head of the user when the user wears the image display unit 20. In this case, the belt allows the image display unit 20 to be firmly held on the head of the user.

The right display unit 22 is configured to display images on the right light-guiding plate 26. The right display unit 22 is provided on the right holding portion 21 and lies adjacent to the right temple of the user when the user wears the image display unit 20. The left display unit 24 is configured to display images on the left light-guiding plate 28. The left display unit 24 is provided on the left holding portion 23 and lies adjacent to the left temple of the user when the user wears the image display unit 20.

The right light-guiding plate 26 and the left light-guiding plate 28 according to the exemplary embodiment are optical parts (e.g., prisms) formed of a light transmission-type resin or the like, and are configured to guide image light output by the right display unit 22 and the left display unit 24 to the eyes of the user. Surfaces of the right light-guiding plate 26 and the left light-guiding plate 28 may be provided with dimmer plates. The dimmer plates are thin-plate optical elements having a different transmittance for a different wavelength range of light, and function as so-called wavelength filters. The dimmer plates are arranged to cover a surface of the front frame 27 (a surface opposite to a surface facing the eyes of the user), for example. Appropriate selection of optical property of the dimmer plates allows the transmittance of light to a desired wavelength range, such as visible light, infrared light, and ultraviolet light to be adjusted, and allows the amount of outside light entering the right light-guiding plate 26 and the left light-guiding plate 28 and passing through the right light-guiding plate 26 and the left light-guiding plate 28 to be adjusted.

The image display unit 20 guides image light generated by the right display unit 22 and the left display unit 24 to the right light-guiding plate 26 and the left light-guiding plate 28, respectively, to allow the user to view, by the image light, an image (Augmented Reality (AR) image) along with scenery in an outside world viewed through the image display unit 20 (this is also referred to as "display an image"). In a case where the outside light traveling from the front of the user passes through the right light-guiding plate 26 and the left light-guiding plate 28 and enters the eyes of the user, the image light forming an image and the outside light enter the eyes of the user. The visibility of images viewed by the user can be affected by the intensity of the outside light.

The visibility of images may thus be adjusted, for example, by mounting dimmer plates on the front frame 27 and by appropriately selecting or adjusting the optical properties of the dimmer plates. In a typical example, dimmer plates may be selected to have a light transmittance to allow the user with the HMD 100 to view at least an external scene. The visibility of images may also be improved by suppressing sunlight. The use of the dimmer plates is also expected to be effective in protecting the right light-guiding plate 26 and the left light-guiding plate 28 to prevent, for example, damage and adhesion of dust to the right light-guiding plate 26 and the left light-guiding plate 28. The dimmer plates may be removably attached to the front frame 27 or each of the right light-guiding plate 26 and the left light-guiding plate 28. Alternatively, different types of removable dimmer plates may be provided for replacement, or alternatively the dimmer plates may be omitted.

A camera 61 is arranged on the front frame 27 of the image display unit 20. The camera 61 is provided on a front surface of the front frame 27 and positioned so that the camera 61 does not block the outside light passing through the right light-guiding plate 26 and the left light-guiding plate 28. In the example in FIG. 1, the camera 61 is arranged on the end ER of the front frame 27. The camera 61 may be arranged on the end EL of the front frame 27 or at the connection between the right light-guiding plate 26 and the left light-guiding plate 28.

The camera 61 is a digital camera including an imaging lens, and an imaging element such as a charge-coupled device (CCD) and a complementary metal oxide semiconductor (CMOS). The camera 61 according to the exemplary embodiment is a monocular camera. However, a stereo camera may be adopted. The camera 61 is configured to capture an image of at least part of an external scene (real space) in a front direction of the HMD 100, in other words, in a direction of the field of view of the user when the user wears the image display unit 20. In other words, the camera 61 is configured to capture an image in a range overlapping with the field of view of the user or an image in the direction of the field of view of the user, i.e., an image in a direction of a scene viewed by the user. An angle of view of the camera 61 can be appropriately set. In the exemplary embodiment, the angle of view of the camera 61 is set to allow the camera 61 to capture the entire field of view that is visible to the user through the right light-guiding plate 26 and the left light-guiding plate 28. The camera 61 is controlled by a control function unit 150 (FIG. 6) to capture an image and output the data of the captured image to the control function unit 150.

The HMD 100 may include a distance measurement sensor configured to detect the distance to a measured object located along a predetermined measurement direction. The distance measurement sensor may be arranged at the connection between the right light-guiding plate 26 and the left light-guiding plate 28 of the front frame 27, for example. The measurement direction of the distance measurement sensor may be the front direction of the HMD 100 (a direction overlapping with an imaging direction of the camera 61). The distance measurement sensor may include, for example, a light emitting part, such as a LED or a laser diode, configured to emit light, and a light receiving part configured to receive light reflected by the object to be measured. In this case, a distance is determined by a triangulation process or a distance measurement process based on a time difference. The distance measurement sensor may include, for example, a transmission part configured to transmit ultrasonic waves and a reception part configured to receive the ultrasonic waves reflected by an object to be measured. In this case, a distance is determined by the distance measurement process based on the time difference. Like the camera 61, the distance measurement sensor measures a distance in accordance with an instruction from the control function unit 150 and outputs the result of detection to the control function unit 150.

Figure 2:
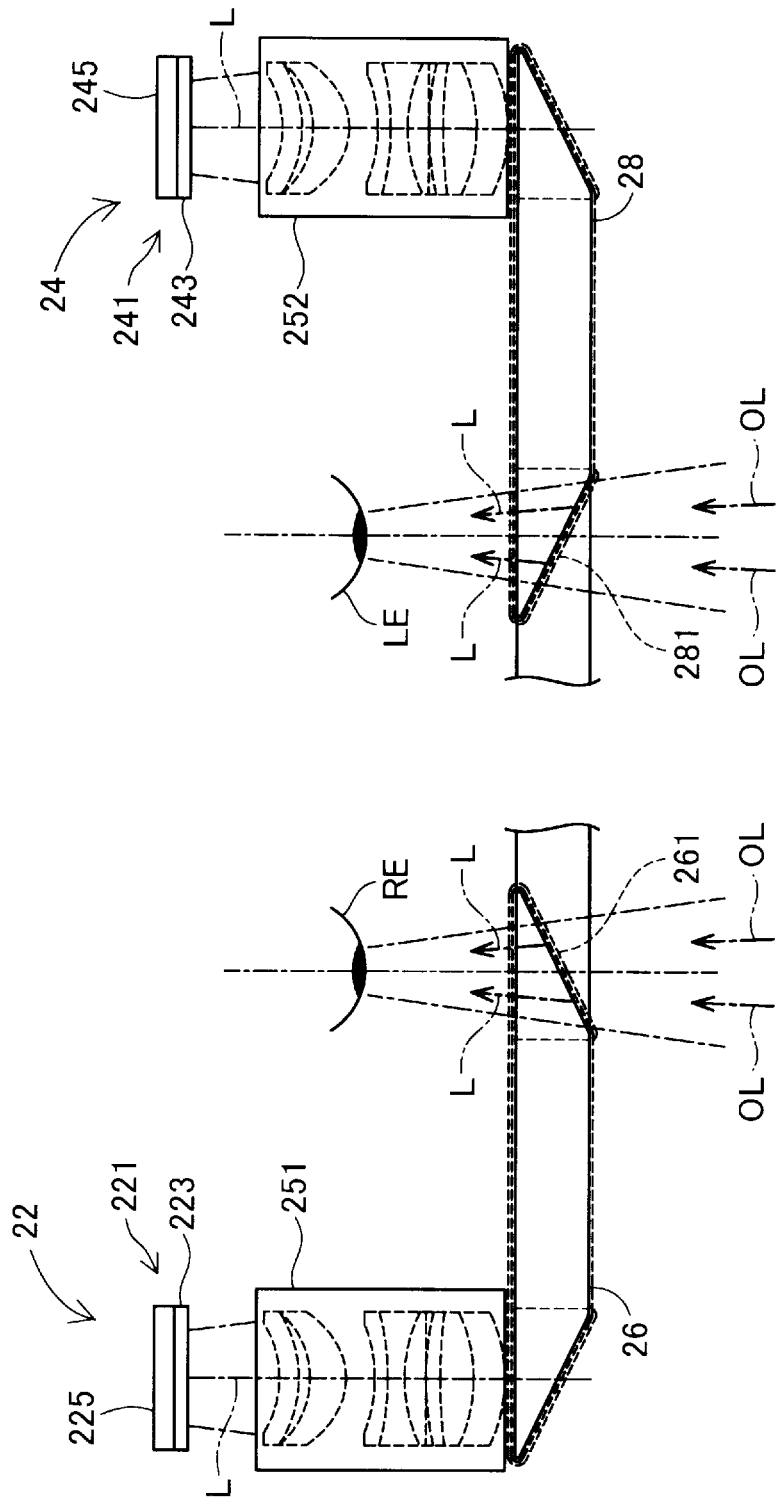
FIG. 2 is a plan view illustrating a configuration of a main part of an optical system included in an image display unit.

FIG. 2 is a plan view illustrating a configuration of a main part of an optical system included in the image display unit 20. For convenience of description, FIG. 2 illustrates the right eye RE and left eye LE of the user. As illustrated in FIG. 2, the right display unit 22 and the left display unit 24 are arranged symmetrically on the right- and left-hand sides.

To allow the right eye RE to view an image (AR image), the right display unit 22 includes an organic light emitting diode (OLED) unit 221 and a right optical system 251. The OLED unit 221 is configured to emit imaging light. The right optical unit 251 includes a lens group and the like and is configured to guide, to the right light-guiding plate 26, imaging light L emitted by the OLED unit 221.

The OLED unit 221 includes an OLED panel 223 and an OLED drive circuit 225 configured to drive the OLED panel 223. The OLED panel 223 is a light emission type display panel including light-emitting elements configured to emit red (R) color light, green (G) color light, and blue (B) color light, respectively, by organic electro-luminescence. The OLED panel 223 includes a plurality of pixels arranged in a matrix, each of the plurality of pixels including one element of R, one element of G, and one element of B.

The OLED drive circuit 225 is controlled by the control function unit 150 (FIG. 6), which will be described later, to select and power the light-emitting elements included in the OLED panel 223 to cause the light-emitting elements to emit light. The OLED drive circuit 225 is secured by bonding or the like, for example, onto a rear face of the OLED panel 223, i.e., back of a light-emitting surface. The OLED drive circuit 225 may include, for example, a semiconductor device configured to drive the OLED panel 223, and may be mounted onto a substrate secured to the rear face of the OLED panel 223. A temperature sensor 217 (FIG. 5) described below is mounted on the substrate. The OLED panel 223 may be configured to include light-emitting elements, arranged in a matrix, that emit white color light, and color filters, disposed over the light-emitting elements, that correspond to the R color, the G color, and the B color, respectively. The OLED panel 223 may have a WRGB configuration including light-emitting elements configured to emit white (W) color light, in addition to light-emitting elements configured to emit R color light, G color light, and B color light, respectively.

The right optical system 251 includes a collimate lens configured to collimate the imaging light L emitted from the OLED panel 223. The image light L collimated by the collimate lens enters the right light-guiding plate 26. A plurality of reflective faces configured to reflect the imaging light L are formed in an optical path configured to guide light in the right light-guiding plate 26. The image light L reflected multiple times inside the right light-guiding plate 26 is guided to the right eye RE. A half mirror 261 (reflective face) in front of the right eye RE is formed on the right light-guiding plate 26. The image light L reflected by the half mirror 261 is emitted from the right light-guiding plate 26 to the right eye RE. The image light L forms an image on the retina of the right eye RE to allow the user to view the image.

To allow the left eye LE to view an image (AR image), the left display unit 24 includes an OLED unit 241 and a left optical system 252. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED panel 243 and an OLED drive circuit 245 configured to drive the OLED panel 243. For further details, the OLED unit 241, the OLED panel 243, and the OLED drive circuit 245 are the same as the OLED unit 221, the OLED panel 223, and the OLED drive circuit 225, respectively. A temperature sensor 239 (FIG. 5) is mounted on a substrate secured to a rear face of the OLED panel 243. For further details, the left optical system 252 is the same as the right optical system 251 described above.

According to the configuration described above, the HMD 100 may serve as a see-through display apparatus. That is, the imaging light L reflected by the half mirror 261 and the outside light OL passing through the right light-guiding plate 26 enter the right eye RE of the user. The imaging light L reflected by the half mirror 281 and the outside light OL passing through the left light-guiding plate 28 enter the left eye LE of the user. In this manner, the HMD 100 allows the imaging light L of the internally processed image and the outside light OL to enter the eyes of the user in an overlapped manner. As a result, the user views an external scene (real world) through the right light-guiding plate 26 and the left light-guiding plate 28 and also views a virtual image (virtual image or AR image) formed by the imaging light L overlapping with the external scene.

The right optical system 251 and the right light-guiding plate 26 are also collectively referred to as a "right light-guiding unit" and the left optical system 252 and the left light-guiding plate 28 are also collectively referred to as a "left light-guiding unit". Configurations of the right light-guiding unit and the left light-guiding unit are not limited to the example described above, and any desired configuration may be adopted as long as imaging light forms an image in front of the eyes of the user. For example, diffraction gratings or translucent reflective films may be used for the right light-guiding unit and the left light-guiding unit.

In FIG. 1, the control device 10 and the image display unit 20 are connected together via a connection cable 40. The connection cable 40 is removably connected to a connector provided in a lower portion of the control device 10 and connects to various circuits inside the image display unit 20 through a tip of the left holding part 23. The connection cable 40 includes a metal cable or an optical fiber cable through which digital data is transmitted. The connection cable 40 may further include a metal cable through which analog data is transmitted. A connector 46 is provided in the middle of the connection cable 40.

The connector 46 is a jack to which a stereo mini-plug is connected, and is connected to the control device 10, for example, via a line through which analog voice signals are transmitted. In the example of the exemplary embodiment illustrated in FIG. 1, the connector 46 connects to a right earphone 32 and a left earphone 34 constituting a stereo headphone and to a headset 30 including a microphone 63.

Figure 5:
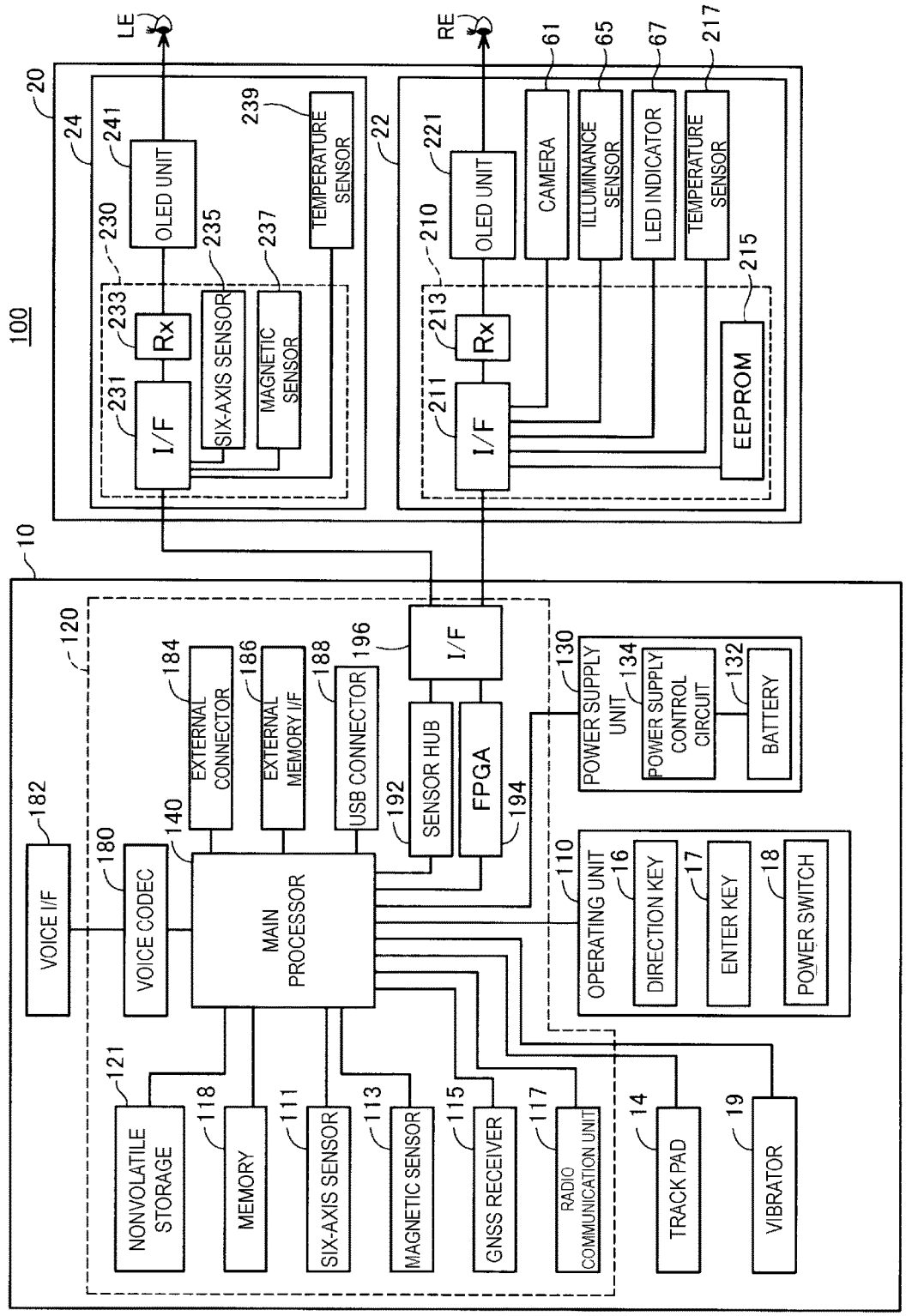
FIG. 5 is a functional block diagram illustrating a configuration of an HMD 100.

As illustrated in FIG. 1, for example, the microphone 63 is arranged such that a sound collector of the microphone 63 faces in a sight direction of the user. The microphone 63 is configured to collect voice and output voice signals to a voice interface 182 (FIG. 5). The microphone 63 may be a monaural microphone or a stereo microphone, or may be a directional microphone or a non-directional microphone.

The control device 10 is used to control the HMD 100. The control device 10 includes an illumination part 12, a track pad 14, a direction key 16, an enter key 17, and a power switch 18. The illumination part 12 is configured to inform the user of an operation state of the HMD 100 (e.g., power ON/OFF) with its light-emitting mode. The illumination part 12 may be, for example, light-emitting diodes (LEDs).

The track pad 14 is configured to detect a touch operation on an operation face of the track pad 14 to output a signal corresponding to what is detected. Any of various track pads, such as an electrostatic-type track pad, a pressure detection-type track pad, and an optical track pad may be adopted as the track pad 14. The direction key 16 is configured to detect a push operation onto any of keys corresponding to up, down, right and left directions to output a signal corresponding to what is detected. The enter key 17 is configured to detect a push operation to output a signal used to determine the operation performed on the control device 10. The power switch 18 is configured to detect a switch sliding operation to switch the state of the power supply for the HMD 100.

Figure 3:
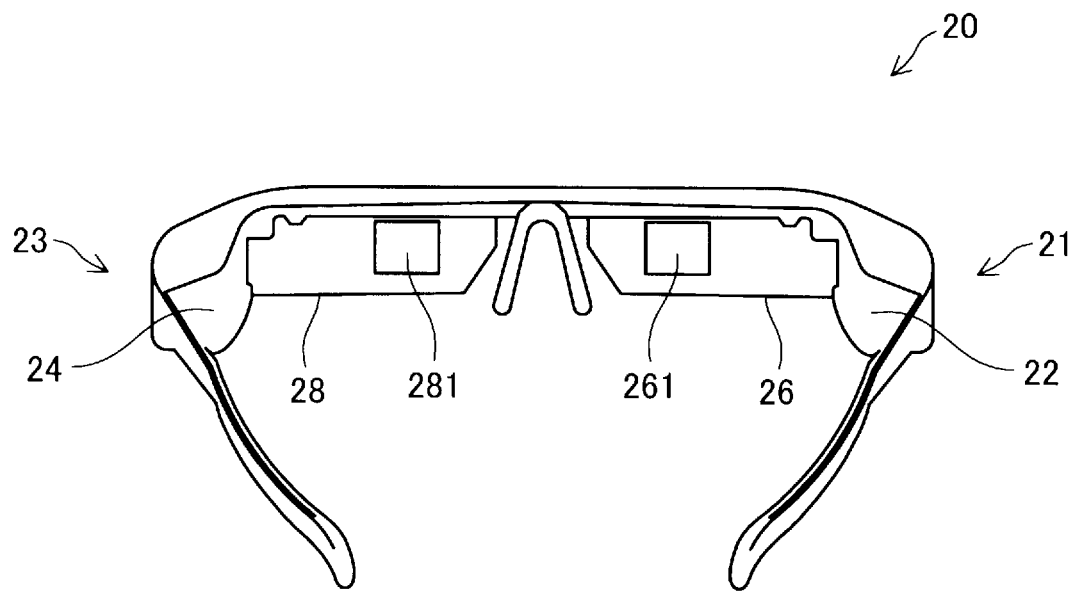
FIG. 3 is a diagram illustrating a configuration of a main part of the image display unit as viewed from a user.

FIG. 3 is a diagram illustrating a configuration of a main part of the image display unit 20 as viewed from the user. In FIG. 3, illustration of the connection cable 40, the right earphone 32, and the left earphone 34 is omitted. In the state illustrated in FIG. 3, back sides of the right light-guiding plate 26 and the left light-guiding plate 28 are visible. The half mirror 261 configured to irradiate imaging light to the right eye RE, and the half mirror 281 configured to irradiate imaging light to the left eye LE are also visible as approximately square-shaped regions. The user views an external scene through the entire areas of the right light-guiding plate 26 and the left light-guiding plate 28 including the half mirrors 261 and 281, and also views rectangular displayed images at the positions of the half mirrors 261 and 281.

Figure 4:
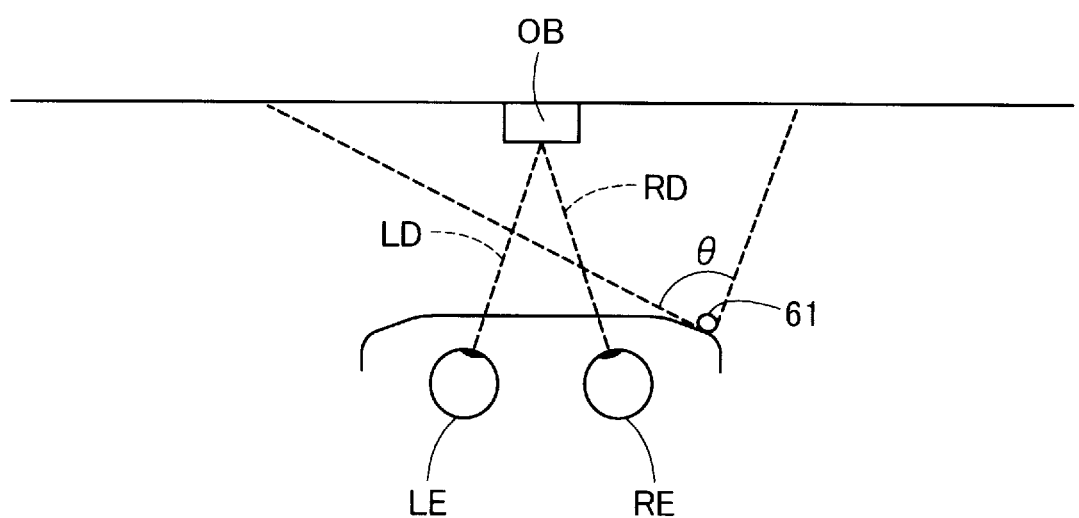
FIG. 4 is a diagram illustrating an angle of view of a camera.

FIG. 4 is a diagram for illustrating the angle of view of the camera 61. FIG. 4 schematically illustrates the camera 61, along with the right eye RE and left eye LE of the user, in a plan view. The angle of view (imaging range) of the camera 61 is represented by θ. The angle of view θ of the camera 61 extends not only in a horizontal direction as illustrated in the figure, but also in a perpendicular direction as is the case with any common digital camera.

As described above, the camera 61 is arranged at an end of on the right-hand side of the image display unit 20 to capture an image in the sight direction of the user (i.e., in front of the user). For this purpose, the optical axis of the camera 61 extends in a direction including sight directions of the right eye RE and the left eye LE. The external scene that is visible when the user wears the HMD 100 is not necessarily an infinitely distant scene. For example, in a case where the user fixates on an object OB with both eyes, the line-of-sight of the user is directed to the object OB as illustrated by reference signs RD and LD in the figure. In this case, the distance from the user to the object OB often ranges from approximately 30 cm to 10 m, both inclusive, and more often ranges from 1 m to 4 m, both inclusive. Thus, standard maximum and minimum distances from the user to the object OB that the user can take during normal use of HMD 100 may be specified. These standards may be predetermined and preset in the HMD 100 or they may be set by the user. The optical axis and the angle of view of the camera 61 are preferably set such that the object OB is included within the angle of view in a case where the distance to the object OB during normal use corresponds to the set standards of the maximum and minimum distances.

In general, the viewing angle of a human is known to be approximately 200 degrees in the horizontal direction and approximately 125 degrees in the vertical direction. Within these angles, an effective visual field advantageous for information acceptance performance is approximately 30 degrees in the horizontal direction and approximately 20 degrees in the vertical direction. In general, a stable field of fixation in which a human can promptly and stably view any point of fixation ranges from approximately 60 degrees to 90 degrees, both inclusive, in the horizontal direction and from approximately 45 degrees to 70 degrees, both inclusive, in the vertical direction. In this case, in a case where the point of fixation lies at the object OB (FIG. 4), the effective visual field is approximately 30 degrees in the horizontal direction and approximately 20 degrees in the vertical direction around the line-of-sights RD and LD. Furthermore, the stable visual field of fixation ranges from approximately 60 degrees to 90 degrees, both inclusive, in the horizontal direction and from approximately 45 degrees to 70 degrees, both inclusive, in the vertical direction. The visual field of the user actually viewing an object through the image display unit 20, the right light-guiding plate 26, and the left light-guiding plate 28 is referred to as an actual field of view (FOV). The actual field of view is narrower than the visual field angle and the stable field of fixation, but is wider than the effective visual field.

The angle of view θ of the camera 61 according to the exemplary embodiment is set to capture a range wider than the visual field of the user. The angle of view θ of the camera 61 is preferably set to capture a range wider than at least the effective visual field of the user and is more preferably set to capture a range wider than the actual field of view. The angle of view θ of the camera 61 is even more preferably set to capture a range wider than the stable field of fixation of the user and is most preferably set to capture a range wider than the visual field angle of the eyes of the user. The camera 61 may thus include a wide angle lens as an imaging lens, and may be configured to capture an image with a wider angle of view. The wide angle lens may include a super-wide angle lens or a semi-wide angle lens. The camera 61 may also include a fixed focal lens, a zoom lens, or a lens group including a plurality of lenses.

FIG. 5 is a functional block diagram illustrating a configuration of the HMD 100. The control device 10 includes a main processor 140 configured to execute a program to control the HMD 100, storages, input and output units, sensors, interfaces, and a power supply unit 130. The main processor 140 connects to the storages, the input/output units, the sensors, the interfaces, and the power supply unit 130. The main processor 140 is mounted on a controller substrate 120 built into the control device 10.

The storages include a memory 118 and a nonvolatile storage 121. The memory 118 constitutes a work area in which computer programs and data to be processed by the main processor 140 are temporarily stored. The nonvolatile storage 121 includes a flash memory and an embedded Multi Media Card (eMMC). The nonvolatile storage unit 121 is configured to store computer programs to be executed by the main processor 140 and various data to be processed by the main processor 140. In the exemplary embodiment, these storages are mounted on the controller substrate 120.

The input and output units include the track pad 14 and an operation unit 110. The operation unit 110 includes the direction key 16, the enter key 17, and the power switch 18, included in the control device 10. The main processor 140 is configured to control the input and output units and acquire signals output from the input and output units.

The sensors include a six-axis sensor 111, a magnetic sensor 113, and a global navigation satellite system (GNSS) receiver 115. The six-axis sensor 111 is a motion sensor (inertia sensor) including a three-axis acceleration sensor and a three-axis gyro (angular velocity) sensor. An inertial measurement unit (IMU) in which these sensors are provided as modules may be adopted as the six-axis sensor 111. The magnetic sensor 113 is, for example, a three-axis geomagnetic sensor. The GNSS receiver 115 is configured to determine a present position (longitude and latitude) of the control device 10, based on navigation signals received from an artificial satellite constituting the GNSS. The sensors (six-axis sensor 111, magnetic sensor 113, and GNSS receiver 115) output detected values to the main processor 140 in accordance with a predetermined sampling frequency. The sensors may output detected values at timings instructed by the main processor 140.

The interfaces include a wireless communication unit 117, a voice codec 180, an external connector 184, an external memory interface 186, a universal serial bus (USB) connector 188, a sensor hub 192, a field programmable gate array (FPGA) 194, and an interface 196. The components are configured to function as an interface with external devices.

The wireless communication unit 117 is configured to perform wireless communication between the HMD 100 and an external device. The wireless communication unit 117 is configured to include an antenna (not illustrated), a radio frequency (RF) circuit, a baseband circuit, a communication control circuit, and the like, or is configured as a device into which these components are integrated. The wireless communication unit 117 is configured to perform wireless communication in compliance with standards such as Bluetooth (trade name) and wireless LAN including Wi-Fi (trade name).

The voice codec 180 is connected to the voice interface 182 and is configured to encode and decode voice signals input and output via the voice interface 182. The voice interface 182 is an interface configured to input and output the voice signals. The voice codec 180 may include an A/D converter configured to convert an analog voice signal into digital voice data and a digital/analog (D/A) converter configured to convert digital voice data into an analog voice signal. The HMD 100 according to the exemplary embodiment outputs voice from the right earphone 32 and the left earphone 34 and collects voice from the microphone 63. The voice codec 180 is configured to convert digital voice data output by the main processor 140 into an analog voice signal, and output the analog voice signal via the voice interface 182. The voice codec 180 is also configured to convert an analog voice signal input to the voice interface 182 into digital voice data, and output the digital voice data to the main processor 140.

The external connector 184 is a connector configured to connect the main processor 140 to an external device (e.g., personal computer, smartphone, or gaming device) configured to communicate with the main processor 140. The external device connected to the external connector 184 may serve as a source of contents, may debug a computer program to be executed by the main processor 140, and may collect an operation log of the HMD 100. The external connector 184 may take various forms. The external connector 184 may be a wired-connection interface such as a USB interface, a micro USB interface, and memory card interface, or a wireless-connection interface such as a wireless LAN interface and a Bluetooth interface.

The external memory interface 186 is an interface configured to connect a portable memory device. The external memory interfaces 186 include, for example, a memory card slot configured to accept a card recording medium for reading and writing data, and an interface circuit. For example, the size and shape of the card recording medium, as well as standards to be used for the card recording medium, may be appropriately selected. The USB connector 188 is an interface configured to connect a memory device, a smartphone, a personal computer, or the like in compliance with the USB standard. The USB connector 188 includes, for example, a connector and an interface circuit in compliance with the USB standard. For example, the size and shape of the USB connector 188, as well as the version of USB standard to be used for the USB connector 188, may be appropriately selected.

The HMD 100 further includes a vibrator 19. The vibrator 19 includes a motor (not illustrated), an eccentric rotor, and the like, and is configured to generate vibration under the control of the main processor 140. The HMD 100 causes the vibrator 19 to generate vibration in a predetermined vibration pattern, for example, in a case where an operation on the operation unit 110 is detected, or in a case where a power supply of the HMD 100 is turned on or off. The vibrator 19 may be provided, instead of being provided in the control device 10, in the image display unit 20, for example, in the right holding part 21 (right temple side) of the image display unit 20.

The sensor hub 192 and the FPGA 194 are connected to the image display unit 20 via the interface (I/F) 196. The sensor hub 192 is configured to acquire detected values of the sensors included in the image display unit 20 and output the detected values to the main processor 140. The FPGA 194 is configured to process data to be transmitted and received between the main processor 140 and components of the image display unit 20, and perform transmissions via the interface 196. The interface 196 is connected to the right display unit 22 and the left display unit 24 of the image display unit 20. In the example of the exemplary embodiment, the connection cable 40 is connected to the left holding part 23. Wiring, in the image display unit 20, connected to the connection cable 40 causes the right display unit 22 and the left display unit 24 to be connected to the interface 196 of the control device 10.

Figure 6:
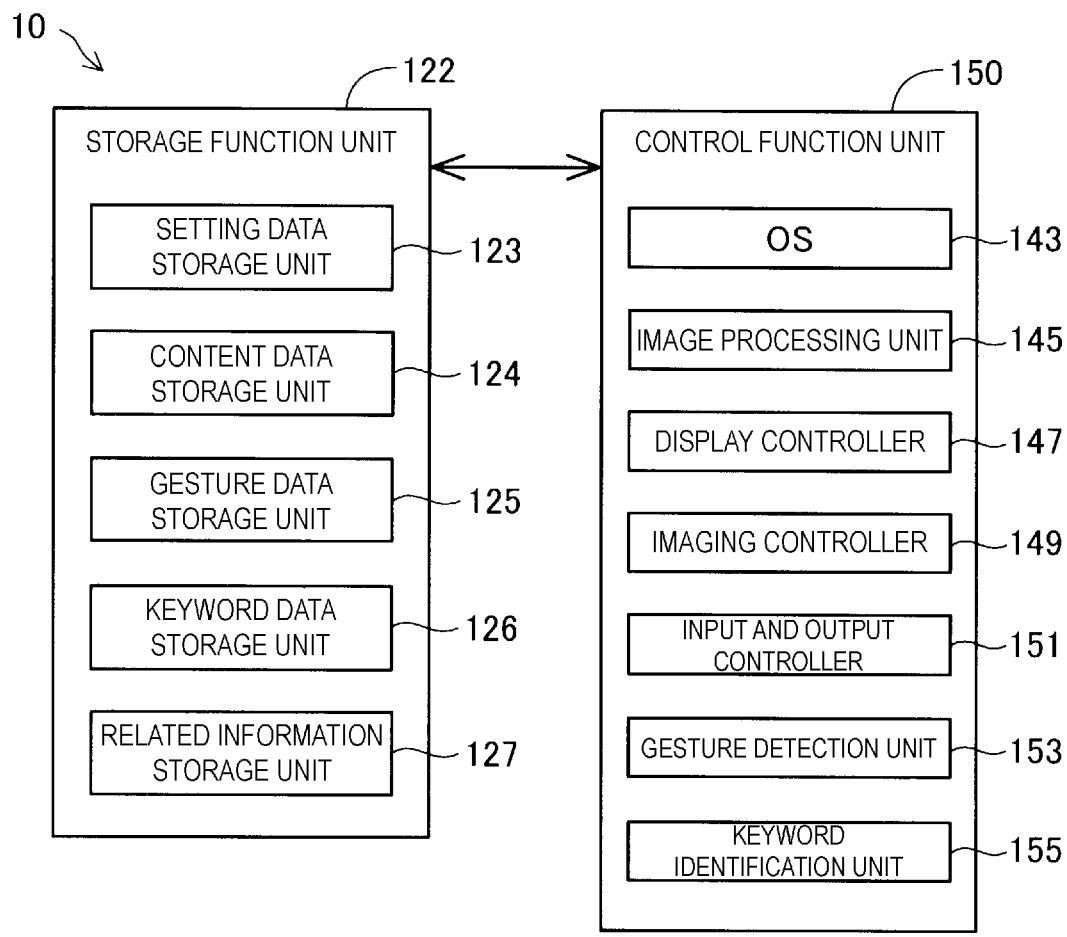
FIG. 6 is a functional block diagram illustrating a configuration of a control device.

The power supply unit 130 includes a battery 132 and a power supply control circuit 134. The power supply unit 130 is configured to supply power used to operate the control device 10. The battery 132 is a rechargeable battery. The power supply control circuit 134 is configured to detect a remaining capacity of the battery 132 and control charging of an operating system (OS) 143 (FIG. 6). The power supply control circuit 134 is connected to the main processor 140, and is configured to output the detected value of the remaining capacity of the battery 132 and the detected value of a voltage of the battery 132 to the main processor 140. Power may be supplied from the control device 10 to the image display unit 20, based on the power supplied by the power supply unit 130. The main processor 140 may be configured to control the state of power supply from the power supply unit 130 to components of the control device 10 and the image display unit 20.

The right display unit 22 includes a display unit substrate 210, an OLED unit 221, a camera 61, an illuminance sensor 65, an LED indicator 67, and a temperature sensor 217. The display unit substrate 210 is equipped with an interface (I/F) 211 connected to the interface 196, a receiving unit (Rx) 213, and an electrically erasable programmable read-only memory (EEPROM) 215. The receiving unit 213 is configured to receive data from the control device 10 via the interface 211. In a case of receiving image data of an image to be displayed on the OLED unit 221, the receiving unit 213 outputs the received image data to the OLED drive circuit 225 (FIG. 2).

The EEPROM 215 is configured to store various data in such a manner that the main processor 140 can read the data. The EEPROM 215 is configured to store, for example, data about light emission properties and display properties of the OLED units 221 and 241 of the image display unit 20, and data about sensor properties of the right display unit 22 or the left display unit 24. Specifically, for example, the EEPROM 215 is configured to store parameters regarding Gamma correction performed by the OLED units 221 and 241, and data used to compensate for the detected values of the temperature sensors 217 and 239 described below. These data are generated when the HMD 100 is inspected at the time of factory shipment, and written into the EEPROM 215. After shipment, the data is loaded from the EEPROM 215 into the main processor 140, and is used for various processes.

The camera 61 is configured to capture an image in accordance with a signal entered via the interface 211, and output imaging data or a signal indicating the result of imaging to the control device 10. As illustrated in FIG. 1, the illuminance sensor 65 is arranged on the end ER of the front frame 27 and is configured to receive outside light from the front of the user wearing the image display unit 20. The illuminance sensor 65 is configured to output a detected value corresponding to the amount of received light (intensity of received light). As illustrated in FIG. 1, the LED indicator 67 is arranged adjacent to the camera 61 on the end ER of the front frame 27. The LED indicator 67 is configured to turn on, while the camera 61 is capturing images, to notify that imaging is being performed.

The temperature sensor 217 is configured to detect a temperature to output a voltage value or a resistance value corresponding to the detected temperature. The temperature sensor 217 is mounted on the rear face of the OLED panel 223 (FIG. 2). The temperature sensor 217 and the OLED drive circuit 225 may be mounted on the same substrate, for example. This configuration allows the temperature sensor 217 to mainly detect the temperature of the OLED panel 223. The temperature sensor 217 may be built into the OLED panel 223 or the OLED drive circuit 225 (FIG. 2). For example, in a case where the OLED panel 223, together with the OLED drive circuit 225, is mounted as an Si-OLED on an integrated semiconductor chip to form an integrated circuit, the temperature sensor 217 may be mounted on the semiconductor chip.

The left display unit 24 includes a display unit substrate 230, an OLED unit 241, and a temperature sensor 239. The display unit substrate 230 is equipped with an interface (I/F) 231 connected to the interface 196, a receiving unit (Rx) 233, a 6-axis sensor 235, and a magnetic sensor 237. The receiving unit 233 is configured to receive data input from the control device 10 via the interface 231. In a case where the receiving unit 233 receives image data of an image to be displayed on the OLED unit 241, the receiving unit 233 outputs the received image data to the OLED drive circuit 245 (FIG. 2).

The six-axis sensor 235 is a motion sensor (inertial sensor) including a three-axis acceleration sensor and a three-axis gyro (angular velocity) sensor. An IMU in which the sensors described above are provided as modules may be adopted as the six-axis sensor 235. The magnetic sensor 237 is, for example, a three-axis geomagnetic sensor. The six-axis sensor 235 and the magnetic sensor 237 are provided in the image display unit 20, and thus detecting a motion of the head of the user when the image display unit 20 is mounted on the user's head. The orientation of the image display unit 20, i.e., the field of view of the user, is determined based on the detected motion of the head.

The temperature sensor 239 is configured to detect the temperature to output a voltage value or a resistance value corresponding to the detected temperature. The temperature sensor 239 is mounted on the rear face of the OLED panel 243 (FIG. 2). The temperature sensor 239 and the OLED drive circuit 245 may, for example, be mounted on the same substrate. This configuration allows the temperature sensor 239 to mainly detect the temperature of the OLED panel 243. The temperature sensor 239 may be built into the OLED panel 243 or the OLED drive circuit 245 (FIG. 2). Details of the temperature sensor 239 is similar to the temperature sensor 217.

The sensor hub 192 of the control device 10 connects to the camera 61, the illuminance sensor 65, and the temperature sensor 217 of the right display unit 22, and to the six-axis sensor 235, the magnetic sensor 237, and the temperature sensor 239 of the left display unit 24. The sensor hub 192 is configured to set and initialize a sampling period of each sensor under the control of the main processor 140. The sensor hub 192 is configured to, for example, supply power to the sensors, transmit control data, and acquire detected values in accordance with the sampling periods of the sensors. The sensor hub 192 is configured to output, at a preset timing, detected values of the sensors included in the right display unit 22 and the left display unit 24, to the main processor 140. The sensor hub 192 may be configured to include a cache function to temporarily retain the detected values of the sensors. The sensor hub 192 may be configured to include a function to convert a signal format or a data format of detected values of the sensors (e.g., function for conversion into a standard format). The sensor hub 192 is configured to start and stop supplying power to the LED indicator 67 under the control of the main processor 140 to turn on or off the LED indicator 67.

FIG. 6 is a functional block diagram illustrating a configuration of the control device 10. In terms of functions, the control device 10 includes a storage function unit 122 and a control function unit 150. The storage function unit 122 is a logical storage configured upon the nonvolatile storage 121 (FIG. 5). Instead of a configuration in which only the storage function unit 122 is used, the storage function unit 122 may be configured to use the EEPROM 215 or the memory 118 in combination with the nonvolatile storage 121. The control function unit 150 is configured upon the main processor 140 that executes a computer program, i.e., upon hardware and software that operate together.

The storage function unit 122 is configured to store various data to be processed by the control function unit 150. Specifically, the storage function unit 122 according to the exemplary embodiment is configured to include a setting data storage unit 123, a content data storage unit 124, a gesture data storage unit 125, a keyword data storage unit 126, and related information data storage unit 127. The setting data storage unit 123 is configured to store various setting values regarding operations of the HMD 100. For example, the setting data storage unit 123 is configured to store parameters, determinants, arithmetic expressions, look up tables (LUTs), and the like that are used by the control function unit 150 for control of the HMD 100.

The content data storage unit 124 is configured to store data (image data, video data, voice data, and the like) of contents including images and videos to be displayed by the image display unit 20 under the control of the control function unit 150. The content data storage unit 124 may be configured to store data of bidirectional content. The bidirectional content means a type of content that is displayed by the image display unit 20 in accordance with an operation of the user. The operating unit 110 acquires the operation of the user, the control function unit 150 performs a process corresponding to the acquired operation, and the image display unit 20 displays a content corresponding to the process. In this case, the data of content may include data such as image data of a menu screen used to acquire an operation of the user, and data for specifying a process corresponding to an item included in the menu screen.

The gesture data storage unit 125 is configured to store information (hereinafter referred to as "association information") in which the types of gestures are associated with the contents of related information of a display object. The "gesture" means a motion of a part of the body of the user wearing the HMD 100, and in the exemplary embodiment, a motion (action) of the hand. Furthermore, the "types of gestures" mean how the hand is moved, for example, a gesture of waving or clasping the hand of the user. The gesture is not limited to the gesture of the user wearing the HMD 100 and may include a gesture of a person other than the user wearing the HMD 100. Furthermore, the gesture is not limited to a motion (action) of the hand, but may be a motion of the hand finger, a motion of the leg, or a motion of any part of the body. The association information is used, in a display object displaying control process described below, to determine the content of related information to be displayed. The types of gestures and the association information will be described below in detail.

The keyword storage unit 126 is configured to store a keyword and the type of keyword that are associated in advance with each other. The "type of keyword" according to the exemplary embodiment means a classification of each keyword used to determine a display mode for an image of a display object that is identified by a keyword entered by the user of the HMD 100. Three types of keywords are available, including a "use mode display keyword", a "presentation mode display keyword", and a "standard display keyword". The "use mode display keyword" is a keyword causing a display object image to be displayed in a display mode for simulating a state where the display object is actually used. Examples of the "use mode display keyword" include "food". The "presentation mode display keyword" is a keyword causing the display object image to be displayed in a presentation mode for simulating a state where the display object is actually presented. Examples of the "presentation mode display keyword" include "fashion". The "standard display keyword" is a keyword that does not correspond to the use mode display keyword nor the presentation mode display keyword, and that causes the display object image to be displayed without simulating a specific state. The display object displaying control process described below involves identifying, from a received keyword, the type of keyword, and displaying the display object image in the display mode corresponding to the type of keyword.

The related information data storage unit 127 is configured to store a display object and related information about the display object that are associated with each other. Priorities are preset for pieces of the related information, and in the display object displaying control process described below, the pieces of the related information are displayed in an order starting from a higher priority. The priorities are updated in the displaying control process. The priority of related information for which the gesture is made becomes higher, while the priority of related information for which the gesture display object is not made becomes lower. In the exemplary embodiment, the "object of the gesture" means an object corresponding to the gesture performed by the user of the HMD 100. Examples of the object of the gesture include a display object image displayed on the image display unit 20 or an image indicating the related information.

The control function unit 150 is configured to use the data stored in the storage function unit 122 to execute various processes, thereby performing functions of the operating system (OS) 143, an image processing unit 145, a display controller 147, an imaging controller 149, an input and output controller 151, a gesture detection unit 153, and a keyword identification unit 155. In the exemplary embodiment, the function units other than the OS 143 are configured as computer programs to be executed on the OS 143.

The image processing unit 145 is configured to generate, based on image data or video data to be displayed on the image display unit 20, signals to be transmitted to the right display unit 22 and the left display unit 24. The signals generated by the image processing unit 145 may be a vertical synchronization signal, a horizontal synchronization signal, a clock signal, an analog image signal, and the like. The image processing unit 145 may be implemented by the main processor 140 that executes a corresponding computer program, or may be configured by using hardware different from the main processor 140 (e.g., digital signal processor (DSP)).

The image processing unit 145 may be configured to execute a resolution conversion process, an image adjustment process, a 2D/3D conversion process, and the like as needed. The resolution conversion process is a process for converting the resolution of image data into a resolution appropriate for the right display unit 22 and the left display unit 24. The image adjustment process is a process for adjusting the brightness and saturation of image data. The 2D/3D conversion process is a process for generating two-dimensional image data from three-dimensional image data, or generating three-dimensional image data from two-dimensional image data. In a case where any of the processes is executed, the image processing unit 145 is configured to generate a signal for displaying an image based on the processed image data and transmits the signal to the image display unit 20 via the connection cable 40.

The display controller 147 is configured to generate control signals for controlling the right display unit 22 and the left display unit 24, and use the control signals to control the generation and emission of the image light by each of the right display unit 22 and the left display unit 24. Specifically, the display controller 147 is configured to control the OLED drive circuits 225 and 245 to cause the OLED panels 223 and 243 to display images. The display controller 147 is configured to control, for example, a timing when the OLED drive circuits 225 and 245 draw images on the OLED panels 223 and 243, and brightness of the OLED panels 223 and 243, based on the signal output by the image processing unit 145.

The display controller 147 is also configured to cause, in the display object displaying control process described below, the image display unit 20 to display an image of a display object (hereinafter referred to as the "display object image") and related information about the display object (hereinafter referred to as the "related information"). In the display object displaying control process described below, the display controller 147 is configured to cause the display object image to be displayed as a three-dimensional parallax image, cause the display object image to be displayed in a display mode corresponding to the type of a keyword indicating the display object, and cause the related information to be displayed according to the type of the user's gesture performed for the display object image that has been displayed. The display object displaying control process will be described below in detail. Note that the display object may hereinafter be referred to as a searched object.

The imaging controller 149 is configured to control the camera 61 to capture an image and generate captured imaging data, and to cause the storage function unit 122 to temporarily store the captured imaging data. In a case where the camera 61 is configured as a camera unit including a circuit for generating imaging data, the imaging controller 149 is configured to acquire the imaging data from the camera 61 and causes the storage function unit 122 to temporarily store the imaging data.

The input and output controller 151 is configured to appropriately control the track pad 14 (FIG. 1), the direction key 16, and the enter key 17 to receive input commands. The received input commands are output to the OS 143 or to a computer program that operates on the OS 143 together with the OS 143. In the exemplary embodiment, the input and output controller 151 receives, in the display object displaying control process described below, a text entry of a keyword indicating a display object from a software keyboard, not illustrated in the drawings, to be displayed on the image display unit 20. In the exemplary embodiment, the input and output controller 151 corresponds to a subordinate concept to an input receiving unit in SUMMARY.

The gesture detection unit 153 is configured to detect a gesture for the display object image to be displayed on the image display unit 20 in the display object displaying control process described below. In the exemplary embodiment, the "gesture for the display object image" means a gesture made within a prescribed distance from the display object image when viewed from the user of the HMD 100. The gesture detection unit 153 is configured to analyze a captured image of the field of view VR of the user to detect a display object image for which a gesture is made, the position of the gesture, and the type of the gesture. In the exemplary embodiment, the "position of the gesture" means a position at which the gesture is detected in the captured image, or the center of gravity of the hand that has made the gesture in the captured image. The position of the gesture may be a position, in a display area PN, that corresponds to the position at which the gesture is detected in the captured image, or a position that displays the display object image for which the gesture has been made. Furthermore, the position of the gesture is not limited to the center of gravity of the hand that has made the gesture but may be a position of a feature point in an area including the hand that has made the gesture. The feature point means, for example, a point at the center of gravity of the area or an end point of the area.

The keyword identification unit 155 is configured to identify the type of the received keyword by referring to, in the display object displaying control process described below, the keyword data storage unit 126.

A2. Augmented Reality Display

Figure 7:
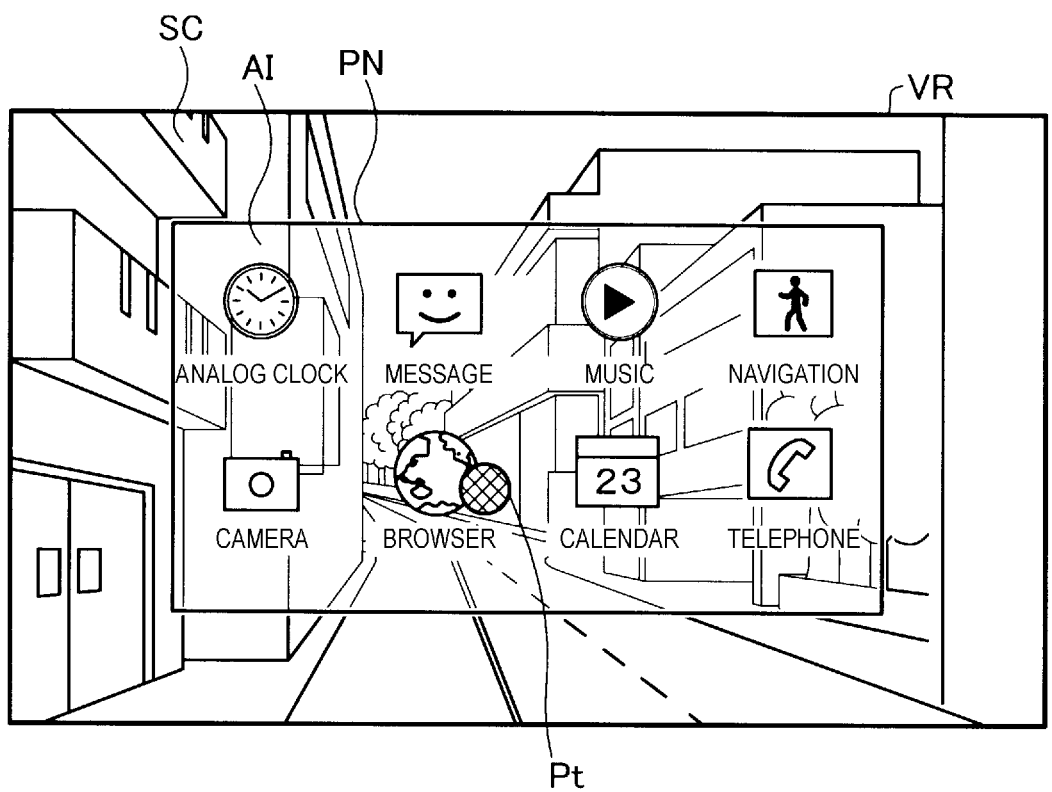
FIG. 7 is an explanatory diagram illustrating an example of augmented reality display provided by the HMD 100.

FIG. 7 is an explanatory diagram illustrating an example of augmented reality display provided by the HMD 100. FIG. 7 illustrates the field of view VR of the user. As described above, image light guided to the eyes of the user of the HMD 100 is formed into an image on the retinas of the user, allowing the user to view, in the display area PN, an object image AI of a display object as augmented reality (AR). In the example illustrated in FIG. 7, the object image AI is a menu screen of the OS of the HMD 100. The menu screen includes icon images for activating application programs such as "Analog clock", "Message", "Music", "Navigation", "Camera", "Browser", "Calendar", and "Telephone". Furthermore, an external light passes through the right light-guiding plate 26 and the left light-guiding plate 28, allowing the user to view an external scene SC. Thus, the user of the HMD 100 according to the exemplary embodiment can view, in a portion displaying the object image AI in the field of view VR, the object image AI in such a manner that the object image AI overlaps the external scenery SC. Furthermore, the user of the HMD 100 according to the exemplary embodiment can view, in a portion not displaying the object image AI in the field of view VR, only the external scenery SC.

As illustrated in FIG. 7, a pointer image Pt is displayed on the object image AI. The pointer image Pt is used by the user to select each menu displayed on the object image AI. In the example illustrated in FIG. 7, the user moves the pointer image Pt onto the "Browser" icon image on the object image AI to select the "Browser" menu. In this state, the user can tap on the track pad 14 to run the "Browser" menu.

A3. Display Object Displaying Control Process

Figure 8:
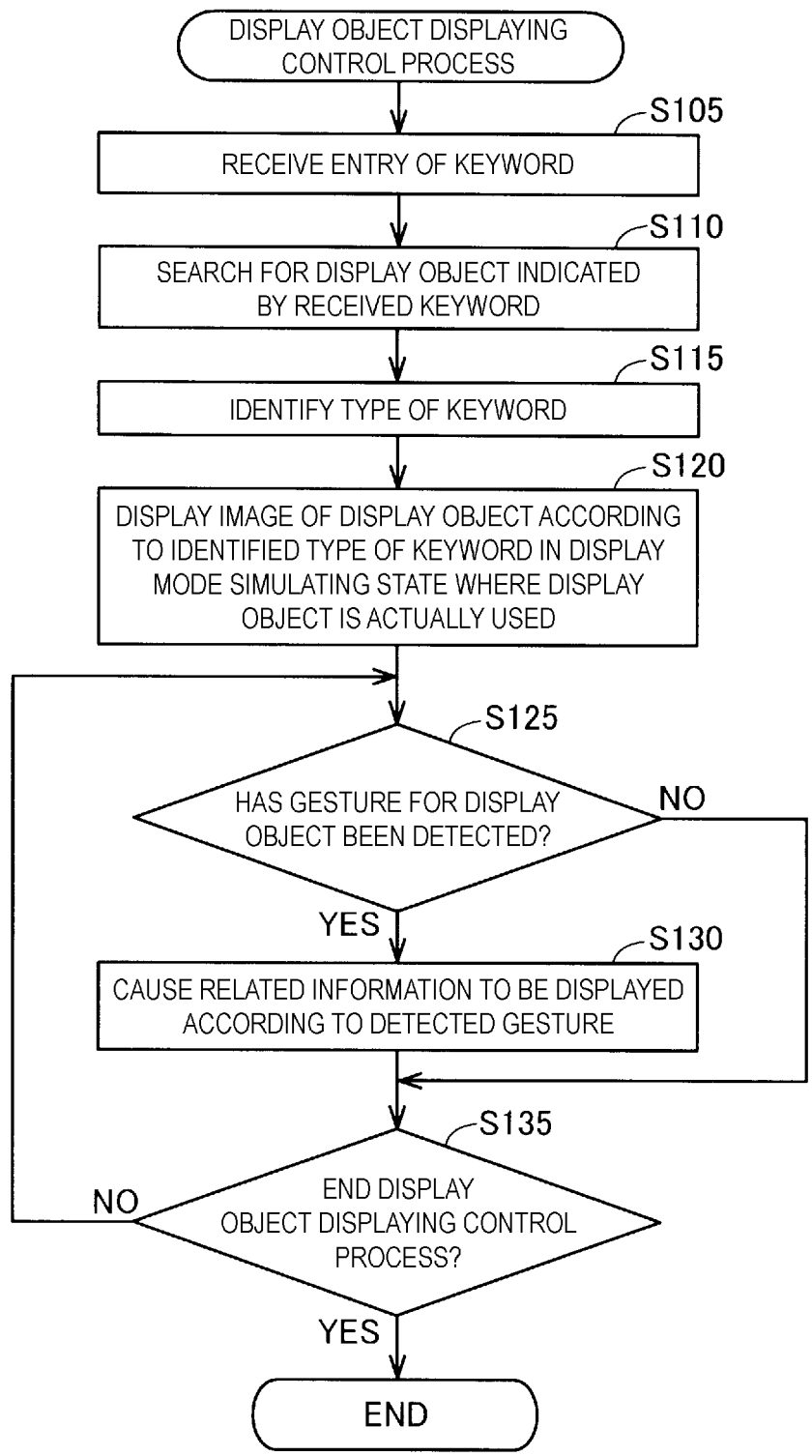
FIG. 8 is a flowchart illustrating how a display object displaying control process proceeds.

First, an outline of the display object displaying control process illustrated in FIG. 8 is described. In a case where the user of the HMD 100 browses (searches)) for a searched object and knows a keyword indicating the searched object, the user can relatively easily acquire, by specifying and searching for the keyword, information about the searched object. However, in a case where the user of the HMD 100 does not know a keyword indicating the searched object or is not confident of the keyword, it is difficult to obtain desired information about the searched object through a relatively small number of searches. Thus, in the exemplary embodiment, the searched object is displayed in the display mode corresponding to the type of the keyword indicating the searched object, and the related information is displayed according to the type of the gesture of the user for the displayed search object. Thus, the user of the HMD 100 can easily acquire information about the searched object. This will be described below in detail.

FIG. 8 is a flowchart illustrating a process procedure of the display object displaying control process. The display object displaying control process is started when a predefined type of search is executed. In the exemplary embodiment, the "predefined type of search" means browsing. The display object displaying control process is started when the "Browser" menu illustrated in FIG. 7 is executed to activate the "Browser" application. In the exemplary embodiment, an example case is described, in which the user of the HMD 100 needs to search for a fashionable watch that suits the user but does not know the appropriate keyword, and enters the keywords "Watch, Fashion". As illustrated in FIG. 8, the input and output controller 151 receives an entry of a keyword(s) (step S105).

Figure 9:
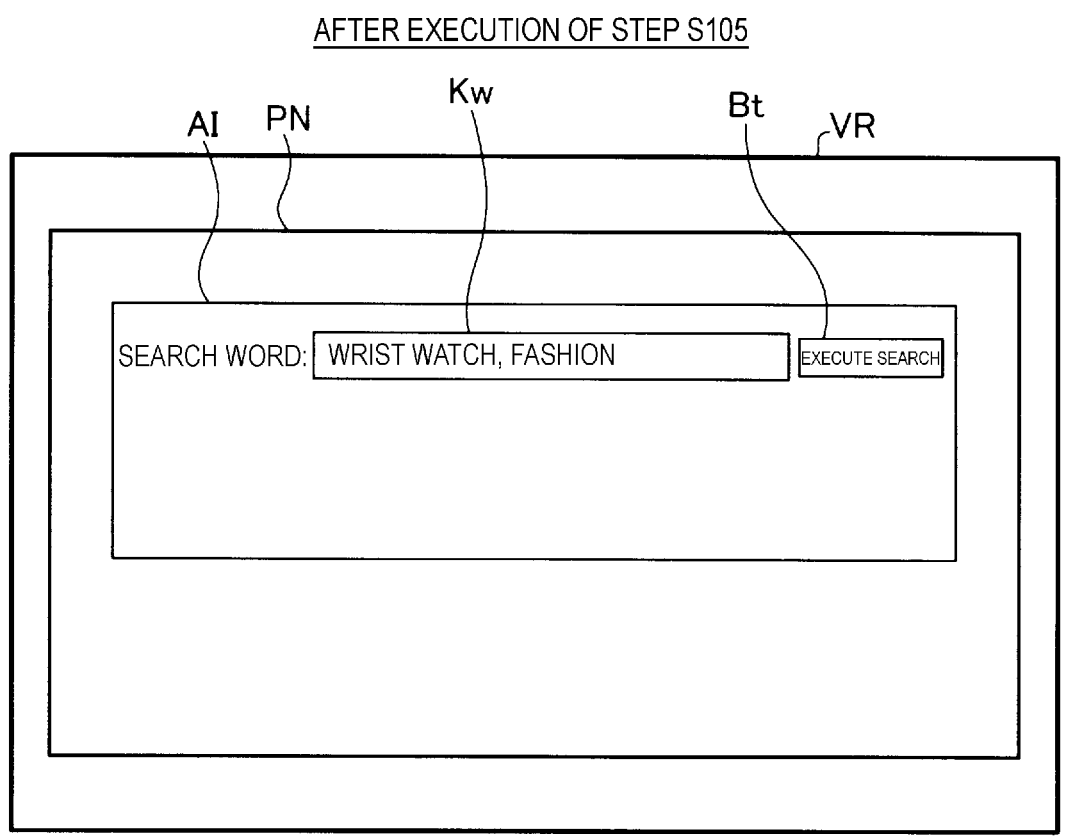
FIG. 9 is an explanatory diagram schematically illustrating an example of a user's field of view after execution of step S105.

FIG. 9 is an explanatory diagram schematically illustrating an example of the field of view VR of the user after execution of step S105. For convenience of description, the external scene SC is omitted in FIG. 9. As illustrated in FIG. 9, the object image AI is displayed in the display area PN. The object image AI is an operation screen for the "Browser" application, and the "Watch, Fashion" have been entered in a search word Kw. The user of the HMD 100 may move onto a search execution button Bt, the pointer image Pt not illustrated in the drawing, and tap on the track pad 14 to execute a search. At this time, the input and output controller 151 receives an entry of the keywords "Watch" and "Fashion" that have been entered in the search word Kw.

As illustrated in FIG. 8, after step S105 is executed, the keyword identification unit 155 searches for a display object representing the received keywords (step S110). Specifically, the keyword identification unit 155 refers to the keyword data storage unit 126 to search for a display object represented by the received keywords.

After step S110 is executed, the keyword identification unit 155 identifies the types of the keywords (step S115). Specifically, the keyword identification unit 155 refers to the keyword data storage unit 126 to identify a type of keyword, among the "use mode display keyword", the "presentation mode display keyword", and the "standard display keyword" described above, to which the received keyword correspond. In the example illustrated in FIG. 9, the received keywords include "Fashion", and thus, the type of keyword is identified as the "use mode display keyword".

After step S115 is executed, the display controller 147 causes a display object image to be displayed, according to the identified type of keyword, in the display mode that simulates the state where the display object is actually used (step S120).

Figure 10:
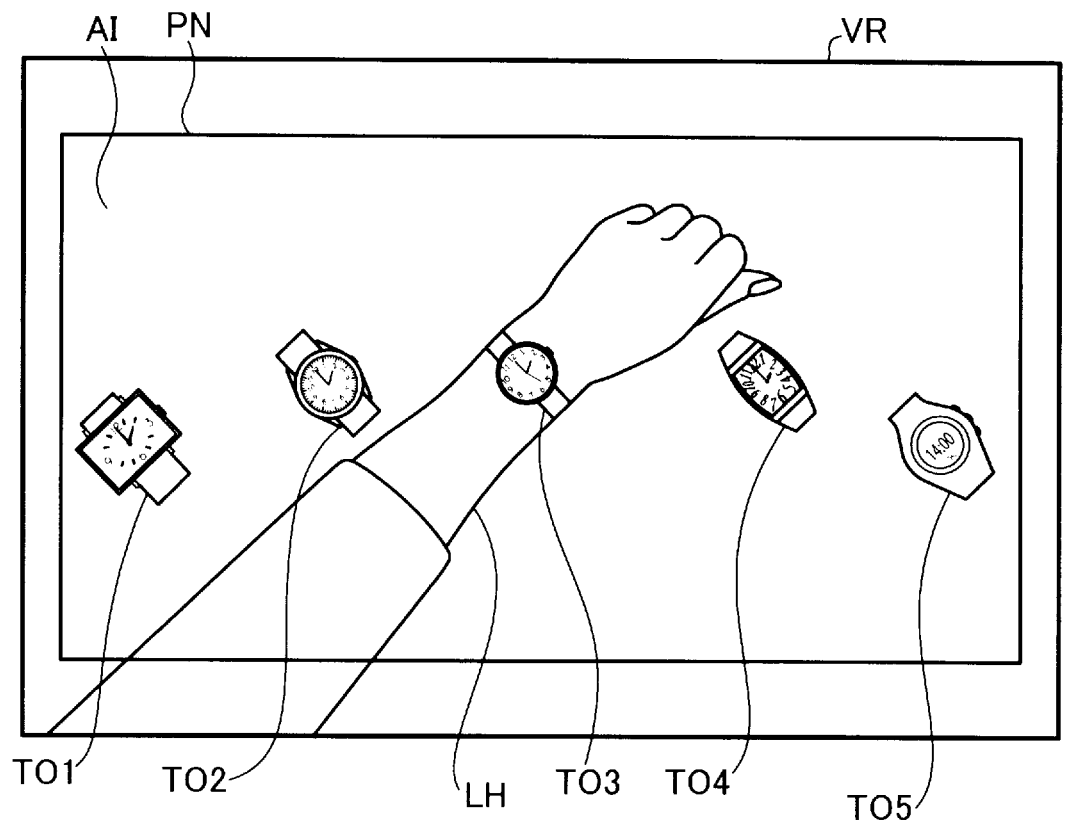
FIG. 10 is an explanatory diagram schematically illustrating an example of the user's field of view after execution of step S120.

FIG. 10 is an explanatory diagram schematically illustrating an example of the field of view VR of the user after execution of step S120. For convenience of description, a part of the external scene SC is omitted in FIG. 10. As illustrated in FIG. 10, the object image AI displays, as a result of the search for the "Watch, Fashion", display object images TO1, TO2, TO3, TO4, and TO5 indicating various watches. Furthermore, the display object image TO3 is displayed in such a manner as to overlap a left wrist LH of the user of the HMD 100, the left arm being viewed through the image display unit 20. Such a display simulates a state where the wristwatch fits on the left wrist LH of the user of the HMD 100, i.e., a state where the wrist watch, which is a display object, is actually used. The display object images TO1 to TO5 are displayed as three-dimensional parallax images and that the display object images are displayed with the relative sizes similar to the actual relative sizes.

As illustrated in FIG. 8, after step S120 is executed, the gesture detection unit 153 determines whether a gesture for any one of the display object images TO1 to TO5 has been detected (step S125). Specifically, the gesture detection unit 153 analyzes a captured image of the field of view VR of the user of the HMD 100 to detect the gesture of the user, and identifies, based on the position of the detected gesture (the area where the gesture has been performed), the object of the gesture.

In a case where it is determined that the gesture for any one of the display object images TO1 to TO5 is detected (step S125: YES), the display controller 147 causes the related information to be displayed according to the detected gesture (step S130). In the exemplary embodiment, "according to" means "corresponding to a type". In other words, the display controller 147 is configured to cause the related information corresponding to the type of detected gesture to be displayed.

FIG. 11 is an explanatory diagram illustrating an example of an association relationship between the types of gestures and the contents of related information.

Association information GL is stored in advance in the gesture data storage unit 125. As illustrated in FIG. 11, the association information GL associates the types of gestures with the contents of related information on a one-to-one basis. Note that in a case that the content of related information indicates "-", no content of related information is associated with the type of gesture in FIG. 11. In this case, no related information is displayed, and a display object image is displayed in the display mode corresponding to the type of gesture. This will be described below in detail.

As illustrated in the row of No. 1 in FIG. 11, in a case where the type of gesture is "grasping", no related information is displayed, and selection of a display object for which the gesture is made is displayed. In the exemplary embodiment, the gesture of "grasping" means a gesture of opening the palm of the hand, closing the palm of the hand at a particular position, and keeping that state for a while. For example, in a case where images of a plurality of fruits are displayed as display objects and a gesture of "grasping" an image of a particular fruit is detected, selection of the particular fruit is displayed. Note that, in a case where the type of keyword corresponds to the "use mode display keyword" and a gesture of "grasping" a particular display object image is detected, selection of the particular display object is displayed and the related information of the display object selected, such as a sales status, may also be displayed.

As illustrated in the row of No. 2 in FIG. 11, in a case where the type of the gesture is "stroking", the texture and material of the display object are displayed as the related information. In the exemplary embodiment, the gesture of "stroking" means a gesture of opening the palm of the hand, placing the palm of the hand onto a particular part of the display object, and moving the hand placed. For example, in a case where images of a plurality of carpets are displayed as display objects and a gesture of "stroking" an image of a particular carpet is detected, information such as the thickness of a pile of the particular carpet and the material of the carpet is displayed.

As illustrated in the row of No. 3 in FIG. 11, in a case where the type of gesture is "touching", no related information is displayed, and selection of a display object for which the gesture is made is displayed. In the exemplary embodiment, the gesture of "touching" means a gesture of moving, by using one of the palm of the hand, any finger of the hand, a fist, and the like, the display object to a particular position, or gently touching the display object and then quickly pulling the hand back. For example, in a case where position information, text information, or the like is displayed as a display object and a gesture of "touching" a particular piece of the position information is detected, selection of the particular piece of the information is displayed.

As illustrated in the row of No. 4 in FIG. 11, in a case where the type of gesture is "pulling", the inside and the mechanism of the display object are displayed as the related information. In the exemplary embodiment, the gesture of "pulling" means a gesture of moving, after the gesture of "grasping" described above, the hand closer to the user. For example, in a case where an image of a car is displayed as a display object and a gesture of "pulling" a handle portion of a door of the car is detected, the interior of the car or interior information about the compartment of the car is displayed.

As illustrated in the row of No. 5 in FIG. 11, in a case where the type of gesture is "cutting", the inside and the mechanism of the display object are displayed as the related information. In the exemplary embodiment, the gesture of "cutting" means a gesture of opening the hand, stretching the fingers, and moving the hand with the side of the hand directed to the display object. For example, in a case where an image of an apple is displayed as a display object and a gesture of "cutting" the image is detected, information representing a cross section of the apple (cross-sectional view) is displayed.

As illustrated in the row of No. 6 in FIG. 11, in a case where the type of gesture is "nipping", the length of the display object is displayed as the related information. In the exemplary embodiment, the gesture of "nipping" means a gesture of nipping the display object with both hands or any fingers of the hand. For example, in a case where an image of a dish is displayed as a display object and a gesture of "nipping" the diameter of the dish is detected, a numerical value indicative of the diameter of the dish is displayed.

As illustrated in the row of No. 7 in FIG. 11, in a case where the type of gesture is "lifting", the weight of the display object is displayed as the related information. In the exemplary embodiment, the gesture of "lifting" means a gesture of moving, after the gesture of "grasping", the display object in a direction opposite to the direction of gravity. For example, in a case where an image of a dish is displayed as a display object and a gesture of "lifting" the dish is detected, a numerical value indicative of the weight of the dish is displayed. Note that a gesture of "lifting" can be made even for a display object, such as a car and furniture, that is difficult to lift with the hands in the real world, and information indicative of the weight of the display object is displayed.

As illustrated in the row of No. 8 in FIG. 11, in a case where the type of gesture is "pinching", no related information is displayed, and selection of a display object for which the gesture is made is displayed. In the exemplary embodiment, the gesture of "pinching" means a gesture of moving two or more fingers such that the display object is sandwiched between the fingers. For example, in a case where an image of a strawberry is displayed as a display object and a gesture of "pinching" an image of the strawberry is detected, selection of the strawberry is displayed.

As illustrated in the row of No. 9 in FIG. 11, in a case where the type of gesture is "using", information about the actual use of the display object is displayed as the related information. In the exemplary embodiment, the gesture of "using" means a gesture that represents a state where the display object is actually used, and that varies depending on the display object. For example, in a case where the display object is a baseball bat, the gesture of "using" corresponds to a gesture of swinging the bat. In a case where such a gesture is detected, information about a swing form is displayed as the related information. For example, in a case where the display object is a prescribed food, the gesture of "using" corresponds to a gesture representing an action of eating the food. In this case, cooking ingredients, a recipe, store information, and the like are displayed as the related information.

In this way, in step S130 described above, the display mode for displaying the display object is changed according to the type of gesture made by the user of the HMD 100, and the display object for which the gesture is made. In other words, the display mode is switched on the assumption that the object of the gesture made by the user of the HMD 100 represents an object of desired information of the user, and that the type of the gesture made by the user of the HMD 100 represents the content of the desired information of the user. This process is executed because the exemplary embodiment assumes that the user of the HMD 100 does not know the display object well, and thus, allows the user to perform an intuitive operation to the display object image to acquire the desired information.

Figure 12:
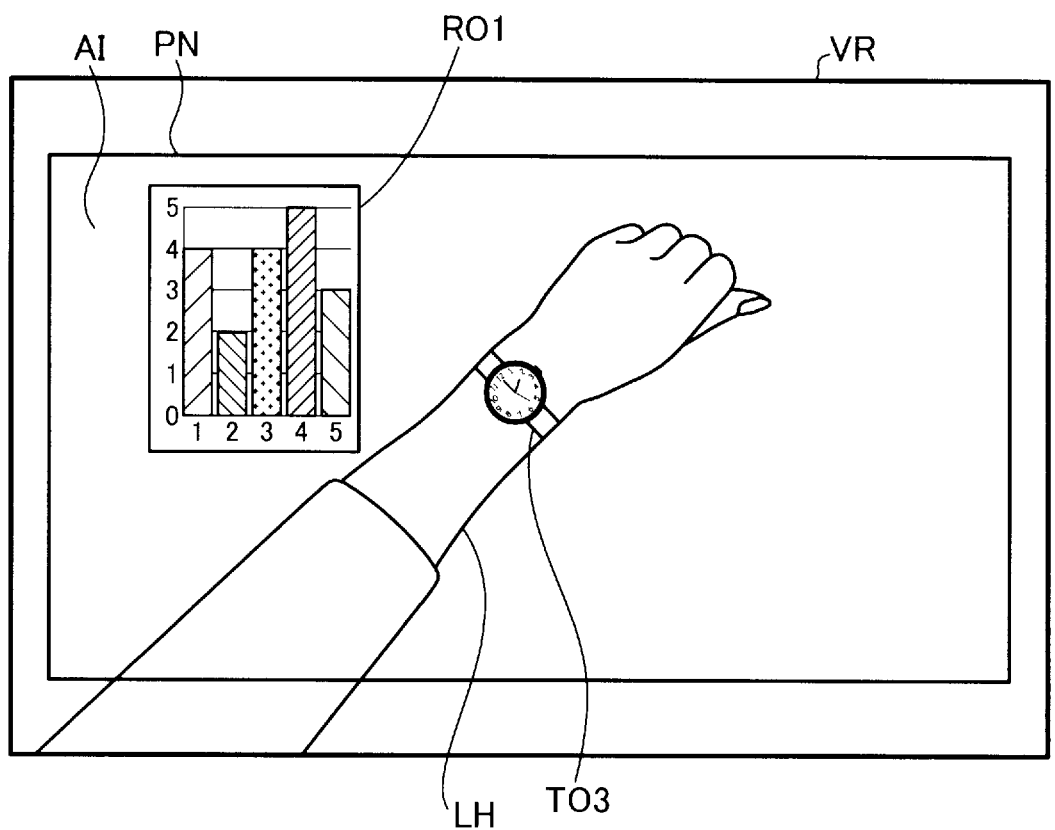
FIG. 12 is an explanatory diagram schematically illustrating an example of the user's field of view after execution of step S130.

FIG. 12 is an explanatory diagram schematically illustrating an example of the field of view VR of the user after execution of step S130. FIG. 12 illustrates a case where, in the example illustrated in FIG. 10, the gesture of "grasping" the display object image TO3 is made in step S125 described above. As illustrated in FIG. 12, the object image AI displays related information RO1 in addition to the display object image TO3. The related information RO1 may be, for example, information indicating the sales status of the display object image TO3 and the number of searches.

For example, in a case where, in the example illustrated in FIG. 10, a prescribed gesture is made for the display object image 101 in step S125 described above, related information about the display object image 101, which is not illustrated in the drawing, is displayed according to the type of the gesture. In this way, the display controller 147 determines the display object for which the related information is displayed, according to the position of the gesture made for the display object image, and causes the related information corresponding to the type of the gesture to be displayed.

As illustrated in FIG. 8, after step S130 described above is executed, the display controller 147 determines whether to terminate the display object displaying control process (step S135). Specifically, the display controller 147 determines whether an instruction to terminate the "Browser" application has been given. In a case where it is determined that the display object displaying control process is to be terminated (step S135: YES), the display object displaying control process is terminated. On the other hand, in a case where it is determined that the display object displaying control process is not to be terminated (step S135: NO), the display controller 147 returns to step S125 described above to execute steps S125 to S135 again.

In a case where it is determined that no gesture for the display object images TO1 to TO5 has been detected (step S125: NO), the display controller 147 executes step S135 described above.

The HMD 100 according to the exemplary embodiment described above includes the gesture detection unit 153 configured to detect a predefined gesture for an image that has been displayed, and the display controller 147 configured to cause a displayed object image to be displayed in a display mode corresponding to the detected gesture and cause the related information, associated with the displayed object, that corresponds to the type of the detected gesture display object to be displayed. Therefore, the HMD 100 causes the display object image to be displayed in the display mode corresponding to the detected gesture, allowing operability in displaying the display object image to be improved, and also causes the related information, associated with the display object, that corresponds to the type of the detected gesture to be displayed, allowing the information about the display object to be easily acquired. In other words, the HMD 100 allows the operability in searching for the display object to be improved, and allows the information about the display object to be easily acquired.

Furthermore, the displayed content of the related information changes according to the position of the detected gesture, thus allowing the user to acquire different related information depending on the position of the gesture made by the user, and easily acquire various types of related information. Moreover, the image identified by the received keyword is displayed, according to the type of the received keyword, in the display mode that simulates the state where the displayed object is actually used, thus allowing the user to easily imagine the state where the displayed object is actually used, resulting in the improvement of the convenience of the user display object.

In addition, the entry of text keywords can be received as a keyword entry, thus allowing the convenience of the user to be improved. Furthermore, the image is displayed as a three-dimensional parallax image, thus allowing the displayed object image to be clearly displayed, and display object to have improved visibility. In addition, the display object image is displayed as a result of browsing (search) of the searched object, thus allowing operability in searching for the searched object to be improved.

B. Second Exemplary Embodiment

B1. Overall Configuration of Transmission-Type Display Apparatus

A head mounted display apparatus 100 according to Second Exemplary Embodiment is the same as the head mounted display apparatus 100 according to First Exemplary Embodiment illustrated in FIG. 1. Detailed description of the head mounted display apparatus 100 according to Second Exemplary Embodiment is thus omitted.

A control function unit according to Second Exemplary Embodiment is different from the control function unit 150 according to First Exemplary Embodiment in that a display controller 147 is configured to cause an object presentation image to be displayed in addition to the display object image and the related information, and in that a gesture detection unit 153 is configured to detect a gesture for the object presentation image in addition to a gesture for the display object image. The remaining configurations of the control function unit according to Second Exemplary Embodiment are the same as the corresponding configurations of the control function unit 150 according to First Exemplary Embodiment. Detailed description of the remaining configurations is thus omitted.

The display controller 147 according to Second Exemplary Embodiment is configured to cause an object presentation image to be displayed in a case where the identified type of keyword is the "presentation mode display keyword". In the exemplary embodiment, the "object presentation image" means an image to simulate an actual presentation mode for the display object, and an image of presentation equipment used in a case where the display object is actually presented. The object presentation image is different from the display object image. Furthermore, the "actual presentation mode of the display object" represents a broad concept including various presentation modes used in the real world, such as a presentation mode in a case of selling the display object at a retail store, a presentation mode in a case of displaying the display object at an exhibition, and a presentation mode in a case of providing the display object at a dining table or the like.

Furthermore, in a case where a gesture for the object presentation image is detected, the display controller 147 according to Second Exemplary Embodiment is configured to add and delete display object images according to the detected gesture, and cause the resultant display objects to be displayed.

The gesture detection unit 153 according to Second Exemplary Embodiment is configured to detect a gesture for the object presentation image.

B2. Display Object Displaying Control Process

Figure 13:
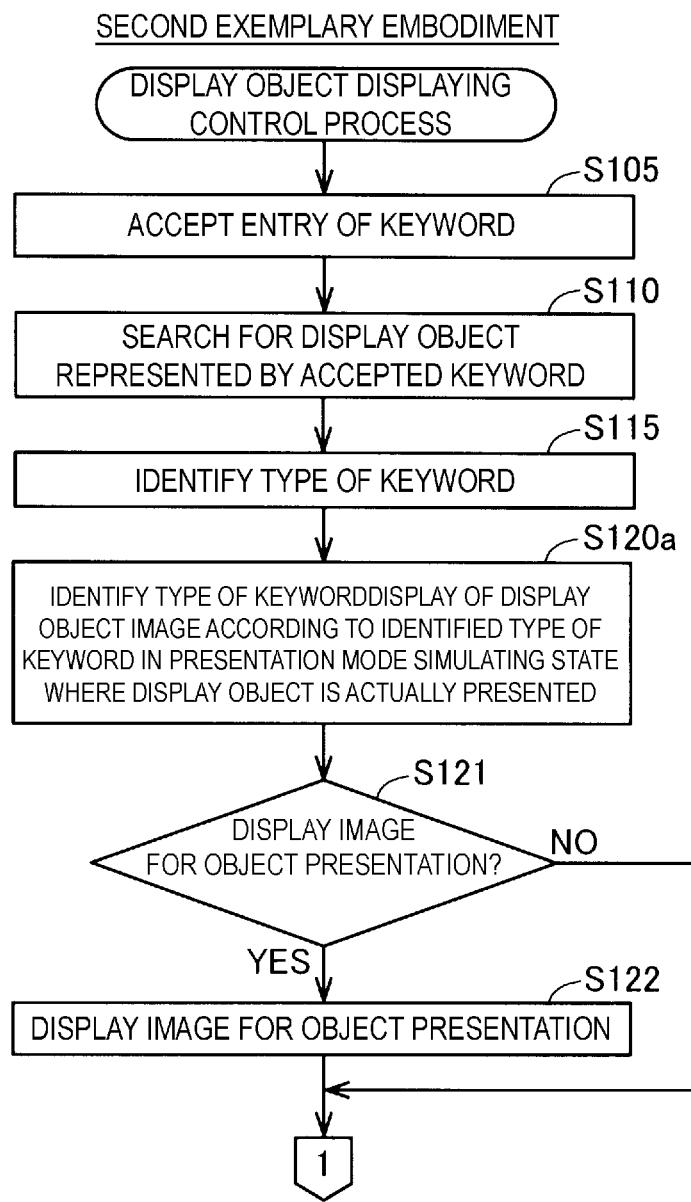
FIG. 13 is a flowchart illustrating how a display object displaying control process according to Second Exemplary Embodiment proceeds.
Figure 14:
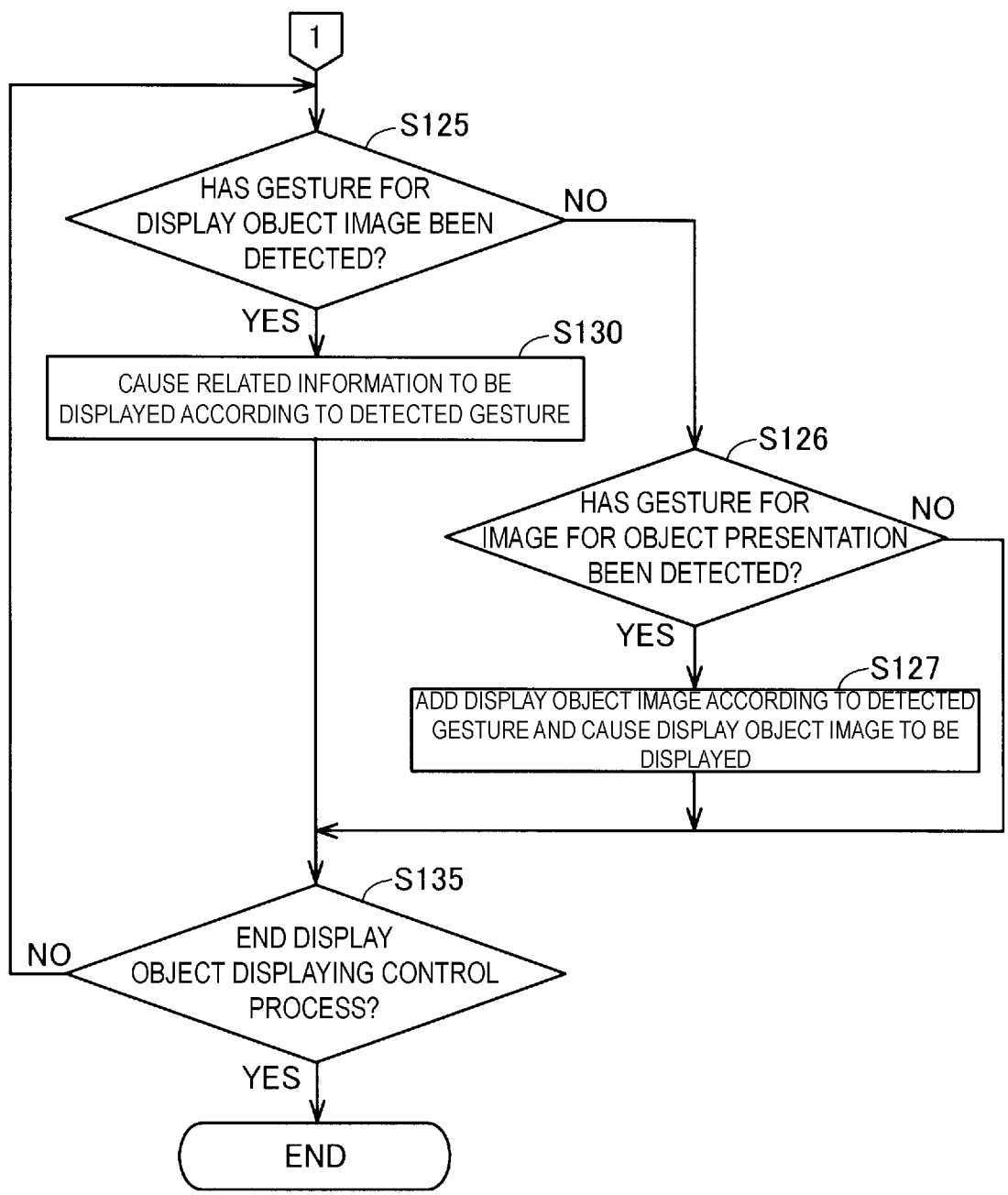
FIG. 14 is a flowchart illustrating how the display object displaying control process according to Second Exemplary Embodiment proceeds.

FIG. 13 and FIG. 14 are flowcharts illustrating how the display object displaying control process according to Second Exemplary Embodiment proceeds. The display object displaying control process according to Second Exemplary Embodiment is different from the display object displaying control process according to First Exemplary Embodiment in that step S120a is executed instead of step S120 and in that step S121, step S122, step S126, and step S127 are additionally executed. The remaining part of the procedure of the display object displaying control process according to Second Exemplary Embodiment is the same as the corresponding part of the procedure of the display object displaying control process according to First Exemplary Embodiment. The same reference signs are assigned to the same procedures, and detailed description of the remaining part of the procedure is thus omitted.

In Second Exemplary Embodiment, the procedure of the display object displaying control process will be described by taking an example where the user of the HMD 100 needs to search for information about "apples" but does not know appropriate keywords and enters keywords "red, food". As illustrated in FIG. 13, in the display object displaying control process according to Second Exemplary Embodiment, the type of keyword is identified (step S115), and then the display controller 147 causes a display object image to be displayed according to the identified type of keyword in a presentation mode that simulates a presentation mode of the display object (step S120a). In the example in Second Exemplary Embodiment, since the entered keywords include "food", the type of keyword is identified as the "presentation mode display keyword". The display object image is consequently displayed in a presentation mode that simulates the presentation mode of the display object.

After step S120a is executed, the display controller 147 determines whether to display an object presentation image (step S121). Specifically, the types of keywords are associated with information indicating whether to display an object presentation image, and pre-stored in the keyword data storage unit 126. The display controller 147 refers to the keyword data storage unit 126 to determine, from the identified type of keyword, whether an object presentation image is needed in presenting the display object.

In a case where it is determined that an object presentation image is to be displayed (step S121, YES), the display controller 147 causes an object presentation image to be displayed (step S122). Note that step S122 may be executed at the same time as step S120a described above. This configuration may be implemented by executing step S121 described above after execution of step S115 described above.

Figure 15:
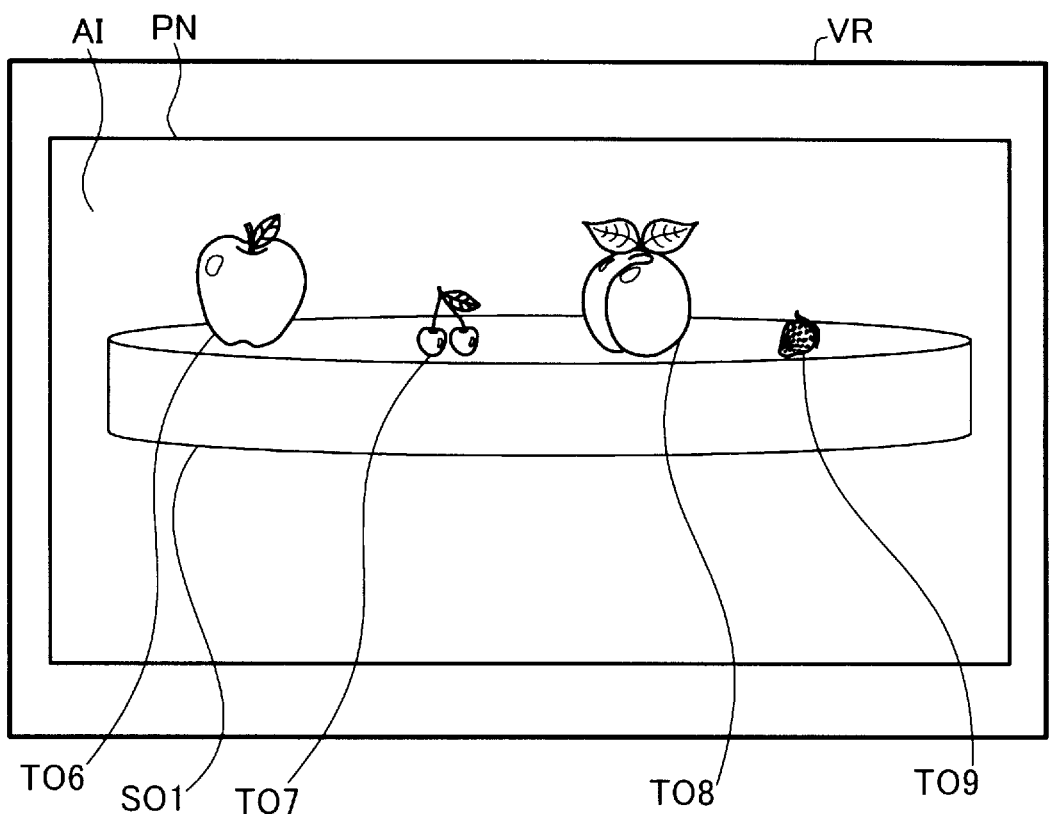
FIG. 15 is an explanatory diagram schematically illustrating an example of the user's field of view after execution of step S122.

FIG. 15 is an explanatory diagram schematically illustrating an example of the field of view VR of the user after execution of step S122. For convenience of description, the external scene SC is omitted in FIG. 15. As illustrated in FIG. 15, in the object image AI display object, the images TO6, TO7, TO8, and TO9, and an object presentation image SO1 are displayed. The display object images TO6 to TO9 represent the results of a search for "red, food", and include the image TO6 of a display object "apple", the image TO7 of a display object "cherry", the image TO8 of a display object "peach", and the image TO9 of a display object "strawberry".

The object presentation image SO1 is an image indicating a turntable, and is an image of presentation equipment used in a case where the "food", which is a display object, is actually presented. The object presentation image SO1 is configured such that operations of the presentation equipment can be performed in a similar manner where the presentation equipment indicated in the image is actually used in the real world. In other words, the user of the HMD 100 may perform operations of the object presentation image SO1 in a similar manner where the presentation equipment indicated in the object presentation image SO1 is actually used. For example, for the turntable indicated as the object presentation image SO1, an operation of turning the turntable can be performed.

As illustrated in FIG. 13, in a case where it is determined, in step S121 described above, that no object presentation image is to be displayed (step S121: NO) or after step S122 described above is executed, step S125 described above is executed as illustrated in FIG. 14. In a case where it is determined in step S125 that no gesture for the display object image has been detected (step S125: NO), the gesture detection unit 153 determines whether any gesture for the object presentation image SO1 has been detected (step S126). Specifically, as is the case with step S125 described above, the gesture detection unit 153 analyzes a captured image of the field of view VR of the user to detect the position of a gesture, and determines whether the gesture is made for the object presentation image SO1. Furthermore, the gesture detection unit 153 also detects the type of gesture as is the case with step S125 described above.

In a case where it is determined that a gesture for the object presentation image SO1 has been detected (step S126: YES), the display controller 147 causes a display object image to be additionally displayed according to the detected gesture (step S127). Specifically, in the example illustrated in FIG. 15, in a case where a gesture of turning clockwise the turntable indicated as the object presentation image SO1 is detected, the image TO6 of the display object "apple" is deleted, and the positions at which the display object images TO7 to TO9 are displayed are moved in a turning direction of the turntable. A new display object, for example, "watermelon" is additionally displayed at the position where the image TO9 of the display object "strawberry" had been displayed. In other words, the display controller 147 is configured to add and delete display object images in response to the gesture of turning the turntable, and to cause the resultant display object images to be displayed.

As illustrated in FIG. 14, after step S127 above described is executed or in a case where it is determined, in step S126 described above, that no gesture for the object presentation image SO1 has been detected (step S126: NO), step S135 described above is executed.

Figure 16:
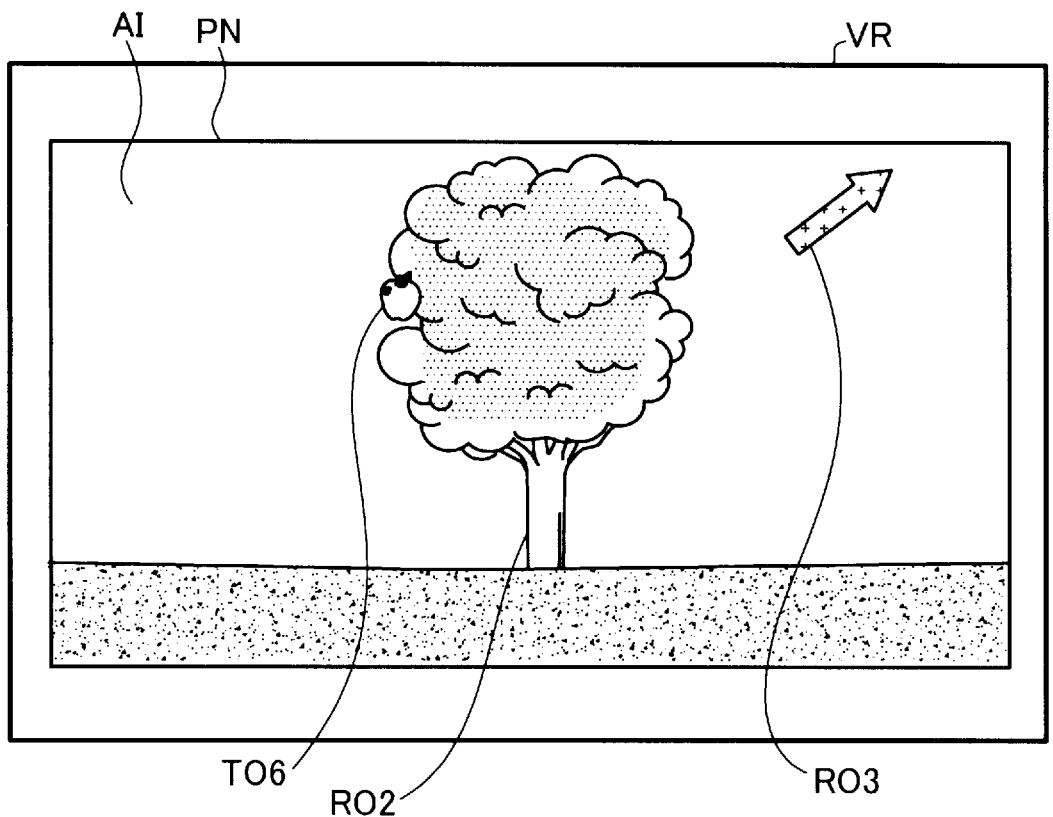
FIG. 16 is an explanatory diagram schematically illustrating an example of the user's field of view after execution of step S130.

FIG. 16 is an explanatory diagram schematically illustrating an example of the field of view VR of the user after execution of step S130. FIG. 16 illustrates a case where, in the example illustrated in FIG. 15, the gesture of "grasping" the image TO6 of the display object "apple" has been made in step S125 described above. As illustrated in FIG. 16, in the object image AI, related information RO2 and related information RO3 are displayed in addition to the image TO6 of the display object "apple". The related information RO2 is information representing a tree of the display object "apple" and is an image indicating the appearance of an "apple tree". The related information RO3 is information representing a famous production area of the display object "apple" and is an image indicating the direction of the famous production area by an arrow. The direction of the famous production area can be calculated based on the current position of the HMD 100 (control device 10). Note that the contents of information to be displayed as the related information are stored in the related information data storage unit 127 and displayed, from the highest priority, in an order of the priorities associated with the related information.

Figure 17:
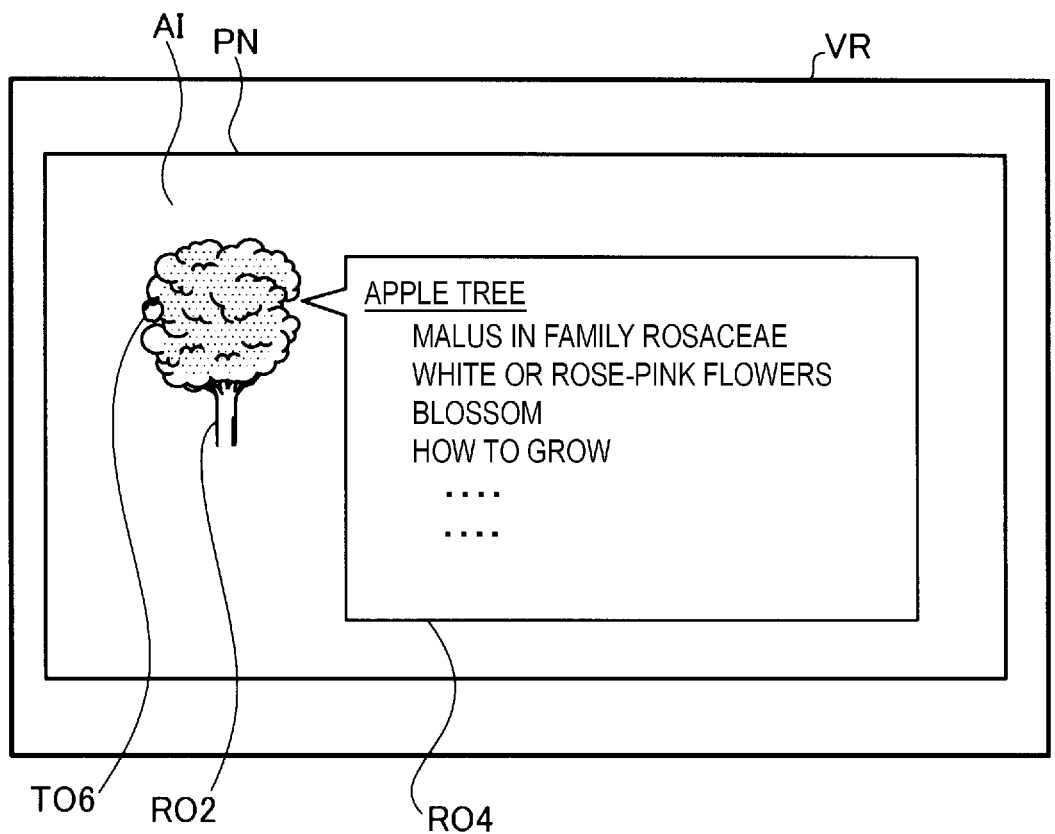
FIG. 17 is an explanatory diagram schematically illustrating an example of the user's field of view after execution of step S130.

FIG. 17 is an explanatory diagram schematically illustrating an example of the field of view VR of the user after execution of step S130. FIG. 17 illustrates a case where, in the example illustrated in FIG. 16, the gesture of "touching" the "apple tree" represented by the related information RO2 has been made in step S125 described above. As illustrated in FIG. 17, in the object image AI, related information RO4 is displayed in addition to the image TO6 of the display object "apple" and the related information RO2. The related information RO4 is information associated with the "apple tree" for which the gesture has been made.

Figure 18:
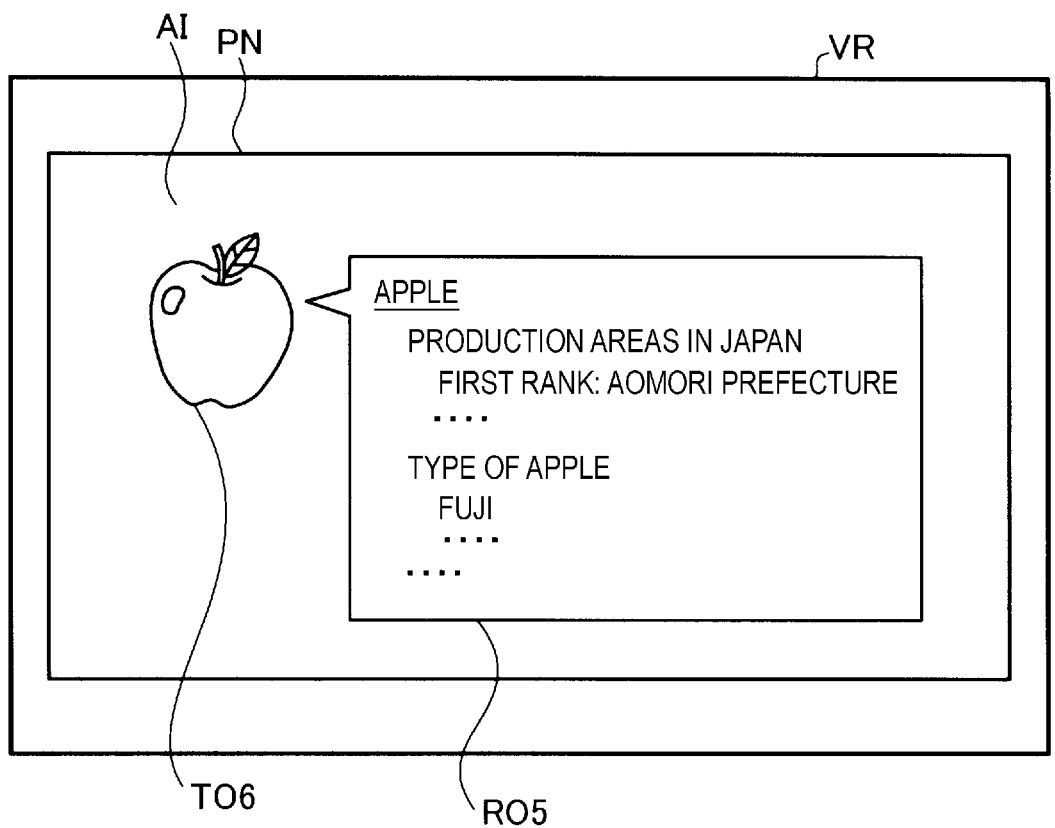
FIG. 18 is an explanatory diagram schematically illustrating an example of the user's field of view after execution of step S130.

FIG. 18 is an explanatory diagram schematically illustrating an example of the field of view VR of the user after execution of step S130. FIG. 18 illustrates a case where, in the example illustrated in FIG. 16, the gesture of "touching" the image TO6 of the display object "apple" has been made in step S125 described above. As illustrated in FIG. 18, in the object image AI, related information RO5 is displayed in addition to the image TO6 of the display object "apple". The related information RO5 is information associated with the "apple tree" for which the gesture has been made.

As is understood by a comparison among FIG. 15, FIG. 16, FIG. 17, and FIG. 18, the display controller 147 changes the content of the related information according to the position of detected gesture and causes the related information with the changed content to be displayed.

According to the HMD 100 of Second Exemplary Embodiment described above, the display object image identified by the received keyword is displayed, according to the type of the received keyword, in the presentation mode that simulates the state where the display object is actually presented, thus allowing the user to intuitively recognize the display object, and resulting in the improvement of the convenience of the user. The object presentation image is displayed that is the image of presentation equipment used in a case where the display object is actually presented, and an image of the display object is additionally displayed according to the gesture for the detected object presentation image, thus allowing the user, by making a gesture for the object presentation image, to cause more display object images to be displayed, and resulting in the improvement of operability in displaying the display object image, as well as the improvement of the convenience of the user.

C. Other Exemplary Embodiments

C1. Other Exemplary Embodiment 1

In First Exemplary Embodiment described above, in a case where the identified type of keyword is the "use mode display keyword", the display object image is displayed in the display mode that simulates the state where the display object is actually used. However, the invention is not limited to this.

Figure 19:
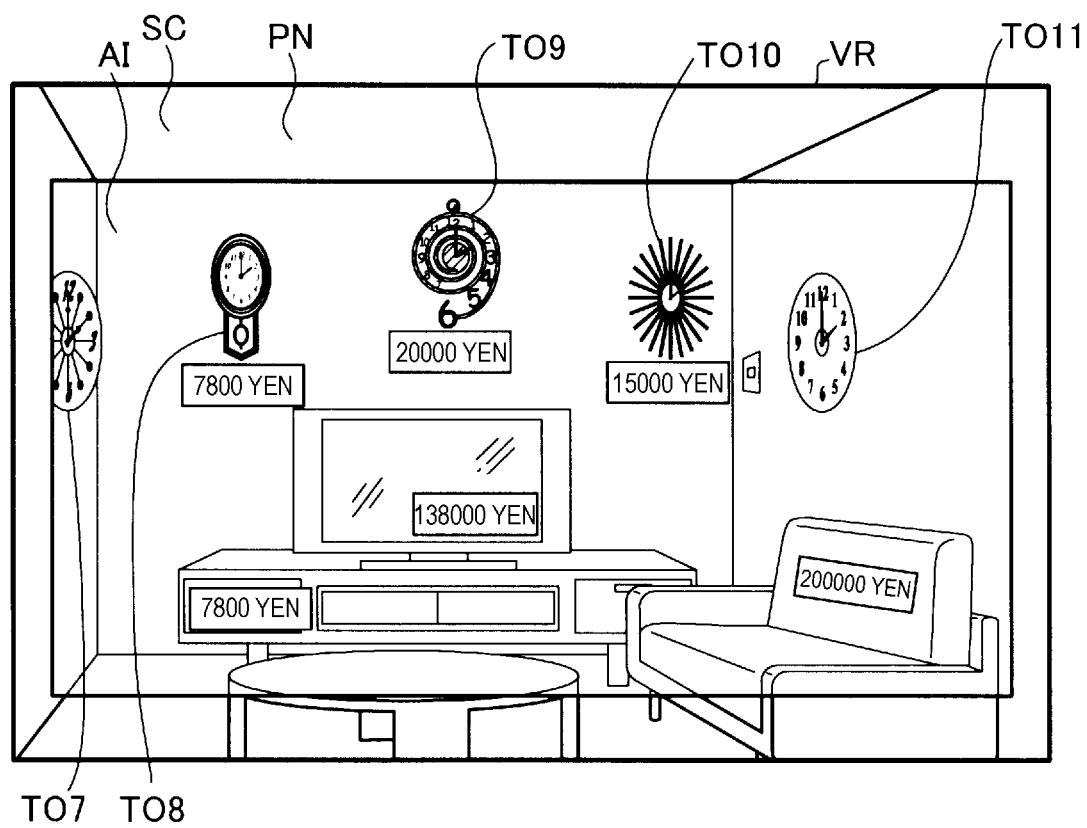
FIG. 19 is an explanatory diagram schematically illustrating an example display of a display object image according to other Exemplary Embodiment 1.

FIG. 19 is an explanatory diagram schematically illustrating an example of a display mode for a display object image according to Other Exemplary Embodiment 1. In the example illustrated in FIG. 19, an example of the field of view VR of the user in a case where "wall clock, fashion" has been searched for is schematically illustrated. As illustrated in FIG. 19, in the object image AI, as a result of the search for the "wall clock, fashion", display object images TO7, TO8, TO9, TO10, and TO11 indicating various clocks are displayed. Furthermore, the display object images TO7 to TO11 are displayed in a presentation mode that simulates the state where the wall clocks are actually presented in a retail store. In other words, in a case where the identified type of keyword is the "use mode display keyword", the display object image is not displayed in the display mode that simulates the state where the display object is actually used. Such a configuration produces effects similar to the effects of First Exemplary Embodiment described above.

C2. Other Exemplary Embodiment 2

The exemplary embodiments described above illustrate the display object and the related information in the case where the received keywords are "wrist watch, fashion", "red, food", and "wall clock, fashion". However, the invention is not limited to this. For example, in a case where the received keyword is "clothes", an image of "clothes" may be displayed in a display mode that simulates a state where the user of the HMD 100 actually wears the "clothes". Furthermore, for example, in a case where the received keyword is a "physical law", an image of an object, such as a circuit diagram, a waveform, or a measuring instrument in the real world, that is related to physics, may be displayed. Furthermore, for example, in a case where the received keyword is "store information", an image of an arrow, a map, a globe, or the like that indicate the direction of a store may be displayed. In other words, in general, effects similar to the effects of the exemplary embodiments described above are produced by any configuration that causes a display object image to be displayed in a display mode that simulates a state where the display object is actually used according to the type of the received keyword or that causes the display object image to be displayed in a presentation mode that simulates a state where the display object image is actually presented according to the type of the received keyword.

C3. Other Exemplary Embodiment 3

In the exemplary embodiments described above, the display controller 147 is configured to executes both an operation of causing a display object image to be displayed in a display mode corresponding to a detected gesture and an operation of causing related information to be displayed corresponding to the detected gesture. However, the invention is not limited to this. For example, the display controller 147 may be configured to exclusively execute the operation of causing the display object image to be displayed in the display mode corresponding to the detected gesture. Furthermore, for example, the display controller 147 may be configured to exclusively execute the operation of causing the related information to be displayed corresponding to the detected gesture. In other words, in general, effects similar to the effects of the exemplary embodiments described above are produced by any configuration that executes at least one of the operation of causing the display object image to be displayed in the display mode corresponding to the detected gesture, and the operation of causing the related information to be displayed corresponding to the detected gesture.

C4. Other Exemplary Embodiment 4

In the exemplary embodiments described above, after execution of step S105 of the display object displaying control process, no keyword is received. However, the invention is not limited to this. For example, after a display object image is displayed (after step S120 or step S120a is executed), a keyword entry may be received. In this configuration, in a case where a search for the keyword entered in step S105 fails, as a result, to acquire the information desired by the user (display object), the user can acquire, by newly adding a keyword, information which is more similar to the desired information. Such a configuration also produces effects similar to the effects of the exemplary embodiments described above.

C5. Other Exemplary Embodiment 5

In the exemplary embodiments described above, entry of text keywords is received. However, the invention is not limited to this. For example, a keyword entry by voice of the user of the HMD 100 may be received. Furthermore, for example, both text input and voice input may be received. In other words, in general, effects similar to the effects of the exemplary embodiments described above are produced by any configuration that receives at least one of a text input of the keyword and a voice input of the keyword.

C6. Other Exemplary Embodiment 6

In the exemplary embodiments described above, a display object image is displayed as a three-dimensional parallax image. However, the invention is not limited to this. For example, the display object image may be displayed as a planar image without parallax. Such a configuration also produces effects similar to the effects of the exemplary embodiments described above.

C7. Other Exemplary Embodiment 7

In the exemplary embodiments described above, the gesture detection unit 153 may be configured to detect a gesture indicating "decision" in addition to the gestures for display object images or the gestures for object presentation images. Specifically, the gesture indicating "decision" may be predefined, and after execution of step S125 illustrated in FIG. 8, a process of determining whether the gesture indicating "decision" has been detected may be executed. In this configuration, in a case where it is determined that the gesture indicating "decision" has been detected, step S130 described above may be executed. Such a configuration also produces effects similar to the effects of the exemplary embodiments described above.

C8. Other Exemplary Embodiment 8

In the exemplary embodiments described above, the display controller 147 is configured to refer to the related information data storage unit 127 to acquire related information. The invention is not limited to this. For example, in a configuration not including the related information data storage unit 127, related information may be acquired from external equipment via the radio communication unit 117. Such a configuration also produces effects similar to the effects of the exemplary embodiments described above.

C9. Other Exemplary Embodiment 9

In the exemplary embodiments described above, the display controller 147 changes the content of related information according to the position of a detected gesture to display the resultant related information. However, the invention is not limited to this. For example, in a configuration where additional entry of keywords is received, the content of the related information may be changed according to the type of an added keyword instead of the position of the gesture to display the resultant related information. Such a configuration also produces effects similar to the effects of the exemplary embodiments described above.

C10. Other Exemplary Embodiment 10

In the exemplary embodiments described above, the keywords are classified into three types. However, the invention is not limited to this. For example, the keywords may be classified into any types that are different from the three types described above. Furthermore, for example, the keywords may not be classified into different types. In this configuration, a display object image may be displayed in a display mode that simulates a state where the display object is actually used or in a presentation mode that simulates a state where the display object is actually presented, or the display object image may be displayed without simulating a specific state. Such a configuration also produces effects similar to the effects of the exemplary embodiments described above.

C11. Other Exemplary Embodiment 11

In the exemplary embodiments described above, received keywords and detected gestures may be stored in the storage function unit 122 as historical data and utilized for the display object displaying control process that follows. Specifically, received keywords, display objects for which gestures are made, and the types of the gestures are stored in association with one another. The stored information is then utilized to analyze the intention of the user. This allows the information desired by the user to be quickly provided in the following display object displaying control process.

C12. Other Exemplary Embodiment 12

In Second Exemplary Embodiment described above, the object presentation image, in the case where the display object is a "food", is an image indicating a "turntable". However, the invention is not limited to this. For example, the object presentation image, in the case where the display object is a "food", may be an image indicating a "buffet style". Furthermore, for example, the object presentation image, in a case where the display object is a "ring", may be an image indicating a "ring case". Furthermore, for example, in a case where the "ring" is illuminated when the "ring" is actually presented, the object presentation image may be an image that simulates a state in which the "ring" is illuminated. In other words, effects similar to the effects of Second Exemplary Embodiment described above are produced by any configuration in which the object presentation image is an image that simulates the actual presentation mode for the display object and that indicates presentation equipment used when the display object is actually presented.

C13. Other Exemplary Embodiment 13

In the exemplary embodiments described above, the OLED units 221 and 241 are configured to include the OLED panels and the OLED drive circuits 225 and 245 that respectively drive the OLED panels 223 and 243, and the OLED panels 223 and 243 are each a self-light-emitting display panel including light emitting elements that emit light by organic electro-luminescence. However, the invention is not limited to this. Furthermore, each of the OLED panels 223 and 243 includes a plurality of pixels arranged in a matrix, and each of the plurality of pixels corresponds to a unit including one element of R, one element of G, and one element of B. However, the invention is not limited to this. For example, the right display unit 22 and the left display unit 24 each may be configured as a video element that includes an OLED panel serving as a light source unit and a modulation element to modulate light emitted by the light source unit to output image light including a plurality of colors of light. Note that the modulation device for modulating the light emitted by the OLED panel is not limited to a configuration in which a transmission-type liquid crystal panel is adopted. For example, a reflective liquid crystal panel may be used instead of the transmission-type liquid crystal panel, or a digital micro-mirror device or a laser scan type laser retinal projection HMD may be used. Such a configuration also produces effects similar to the effects of the exemplary embodiments described above.

C14. Other Exemplary Embodiment 14

In the exemplary embodiments described above, the related information is information corresponding to the type of gesture. However, the invention is not limited to this. For example, the related information may be information corresponding to the speed or intensity of the gesture. Specifically, for the gesture of "stroking", the related information may be information corresponding to the speed or intensity of the stroking. In other words, in general, effects similar to the effects of the exemplary embodiments are produced by any related information that corresponds to the detected gesture and that is associated with the display object.

C15. Other Exemplary Embodiment 15

In the exemplary embodiments, the types of gestures are not limited to the example illustrated in FIG. 11. For example, any other gestures may be used that include a gesture of touching an object in one continuous area, a gesture of touching a plurality of objects located apart from one another, a gesture of changing the position of an object, a gesture of changing the shape of an object, and the like. Such a configuration also produces effects similar to the effects of the exemplary embodiments described above.

C16. Other Exemplary Embodiment 16

In the exemplary embodiments described above, the predefined type of search is browsing. However, the invention is not limited to this. For example, the search may be not only a search based on terms but also a search for a location on a map. Furthermore, for example, the search may be a search for a related word. Specifically, the search may be a search for a rule, sporting equipment, a training method, spectator information, ticket information, a famous player, and the like involved in a search for a sports related word for baseball, soccer, and the like. Furthermore, the search may be a search for a historical figure, an era name, and the like involved in a search for a related word in learning of history and the like. Furthermore, the search may be a search for a calorie, a recipe, a cooking ingredient, and the like involved in a search for a food related word. Furthermore, the search is not limited to a search based on entry of character strings, and any other search method such as image matching and image authentication may be used. The search means a broad concept including a document search, a character string search, an image data search (pixel search), and a voice data search (voice search), and the like. In other words, in general, effects similar to the effects of the exemplary embodiments described above are produced by any resultant display object images acquired by a predefined type of search.

The invention is not limited to the exemplary embodiments described above, but may be implemented in various configurations without departing from the spirits of the invention. For example, appropriate replacements or combinations may be made to the technical features in the exemplary embodiments which correspond to the technical features in the aspects described in the SUMMARY section to solve some or all of the problems described above or to achieve some or all of the advantageous effects described above. Any of the technical features may be deleted as appropriate unless the technical feature is described in the specification as indispensable.

The present application is based on and claims priority from JP Application Serial Number 2017-244059, filed Dec. 20, 2017, the disclosure of which is hereby incorporated by reference herein in its entirety.

What is claimed is:

1. A transmission-type head mounted display apparatus comprising:
    an image display unit configured to transmit an external scene and display an image of a virtual display object to be viewed along with the external scene to create an augmented reality scene;
    a gesture detection unit configured to detect a gesture that refers to the displayed image of the virtual display object and a type of the gesture; and
    a display controller configured to:
        modify a display mode of the image of the virtual display object based on the type of the gesture having been detected, or
        display related information that corresponds to the type of the gesture having been detected, the related information being associated with the virtual display object.

2. The transmission-type head mounted display apparatus according to claim 1, wherein
    in a case of causing the related information to be displayed, the display controller is configured to change content of the related information for display according to a position of the gesture having been detected.

3. The transmission-type head mounted display apparatus according to claim 1, further comprising:
    an input receiving unit configured to receive an input of a keyword, wherein
    the display controller is configured to cause the image of the virtual display object, identified by the keyword having been received, to be displayed according to a type of the keyword having been received in a display mode for simulating a state where the virtual display object identified by the keyword is actually used.

4. The transmission-type head mounted display apparatus according to claim 3, wherein
    the input receiving unit is configured to receive at least one of a text input of the keyword and a voice input of the keyword.

5. The transmission-type head mounted display apparatus according to claim 1, further comprising:
    an input receiving unit configured to receive an input of a keyword, wherein
    the display controller is configured to cause the image of the virtual display object, identified by the keyword having been received, to be displayed according to a type of the keyword having been received in a presentation mode for simulating a state where the virtual display object identified by the keyword is actually presented.

6. The transmission-type head mounted display apparatus according claim 5, wherein
    the image display unit is configured to further display an image for object presentation that is different from the image of the virtual display object and that is an image of presentation equipment used in a case where the virtual display object is actually presented,
    the gesture detection unit is configured to further detect a gesture for the image for object presentation, and
    the display controller is configured to cause the image of the virtual display object to be additionally displayed according to the gesture, for the image for object presentation, that has been detected.

7. The transmission-type head mounted display apparatus according to claim 1, wherein
    the display controller is configured to cause the image of the virtual display object to be displayed as a three-dimensional parallax image.

8. The transmission-type head mounted display apparatus according to claim 1, wherein
    the image of the virtual display object is a result of a predefined type of search.

9. A display control method for a transmission-type head mounted display apparatus including an image display unit configured to transmit an external scene and display an image of a virtual display object to be viewed along with the external scene to create an augmented reality scene, the display control method comprising:
    detecting a gesture that refers to the image of the displayed virtual display object and a type of the gesture; and
    modify a display mode of the image of the virtual display object based on the type of the gesture having been detected, or display related information that corresponds to the type of the gesture having been detected and that is associated with the virtual display object.

10. A non-transitory computer readable medium storing a computer program that implements display control in a transmission-type head mounted display apparatus including an image display unit configured to transmit an external scene and display an image of a virtual display object to be viewed along with the external scene to create an augmented reality scene, the computer program causing a computer to implement:

a function to detect a gesture that refers to the displayed image of the virtual display object and a type of the gesture; and a function to modify a display mode of the image of the virtual display object based on the type of the gesture having been detected, or display related information that corresponds to the type of the gesture having been detected and that is associated with the virtual display object.

\* \* \* \* \*